(12) United States Patent
Singh et al.

(10) Patent No.: US 11,874,822 B1
(45) Date of Patent: Jan. 16, 2024

(54) MULTI-STREAM TRANSACTIONAL EVENT PROCESSING IN A DISTRIBUTED LOG-BASED APPEND-ONLY DATASTORE

(71) Applicant: Amazon Technologies, Inc., Seattle, WA (US)

(72) Inventors: Abhiram Kumar Hare Ram Singh, Billerica, MA (US); Theodore Allen Carroll, Seattle, WA (US); Nathanial Vaughan Langman, Manchester by the Sea, MA (US); Michael Anthony Sciscenti, Laurel, MD (US)

(73) Assignee: Amazon Technologies, Inc., Seattle, WA (US)

( * ) Notice: Subject to any disclaimer, the term of this patent is extended or adjusted under 35 U.S.C. 154(b) by 19 days.

(21) Appl. No.: 17/854,419

(22) Filed: Jun. 30, 2022

(51) Int. Cl.
*G06F 16/23* (2019.01)
*G06F 16/18* (2019.01)

(52) U.S. Cl.
CPC ...... *G06F 16/2365* (2019.01); *G06F 16/1805* (2019.01); *G06F 16/2315* (2019.01)

(58) Field of Classification Search
CPC .................................................. G06F 16/2365
USPC ......................................................... 707/690
See application file for complete search history.

(56) References Cited

U.S. PATENT DOCUMENTS

| 2015/0112948 | A1* | 4/2015 | Fugate | G06F 16/27 |
| | | | | 707/687 |
| 2019/0392061 | A1* | 12/2019 | Terry | G06F 16/2365 |
| 2022/0382650 | A1* | 12/2022 | Schreter | G06F 11/1469 |

* cited by examiner

*Primary Examiner* — Muluemebet Gurmu
(74) *Attorney, Agent, or Firm* — Nicholson DeVos Webster & Elliott LLP

(57) ABSTRACT

Techniques for multi-stream transactional event processing under ACID semantics in a distributed log-based append-only datastore are described. A transaction coordinator writes events that are part of a transaction to a transaction buffer, where the events can be made visible to clients involved in the transaction while other clients are not aware. Upon committing the transaction, an optimistic concurrency control based technique is utilized to attempt to obtain locks on all events involved in the transaction across one or multiple shards by one or multiple designated writer nodes. When all involved writer nodes indicate that they are able to commit their events, the transaction can be committed.

19 Claims, 15 Drawing Sheets

MULTI-STREAM TRANSACTIONAL EVENT PROCESSING IN A DISTRIBUTED LOG-BASED APPEND-ONLY DATASTORE

BACKGROUND

Cloud provider networks enable users to use a variety of computing-related resources such as compute resources, storage resources, networking resources, and the like. One possible computing resource could be provided by a transactional eventing service implementing a distributed log-based append-only datastore. However, implementing ACID-compliant transactions in such systems, as well as supporting saga transactions, is extremely difficult, error-prone, and typically requires significant work on the part of application developers.

BRIEF DESCRIPTION OF DRAWINGS

Various examples in accordance with the present disclosure will be described with reference to the drawings, in which.

DETAILED DESCRIPTION

The present disclosure relates to methods, apparatus, systems, and non-transitory computer-readable storage media for multi-stream transactional event processing in a distributed log-based append-only datastore. According to some examples, a transactional eventing service is implemented to support transactional event processing using ACID (atomicity, consistency, isolation, and durability) semantics. The transactional eventing service, in some examples, is a log-based, append-only, durable event storage system with built in support for event conditions that allow users to place conditions that must be met in order for events to be accepted into the store, and optimistic concurrency control to guarantee write consistency by preventing users from accidentally overwriting changes that were made by others. In some examples, the transactional eventing service utilizes a transaction coordinator and a transaction buffer to support running ACID transactions across multiple streams spanning multiple shards with serializable isolation and supports implementation of use cases needing strong data consistency and coordinated updates across multiple streams as part of a single logical operation (e.g., a "business" operation).

Accordingly, examples disclosed herein make it possible to move a whole new class of transactional applications to an event sourcing architecture. Event Sourcing is a pattern for storing data as events in an append-only log also referred as event streams.

Figure 1:
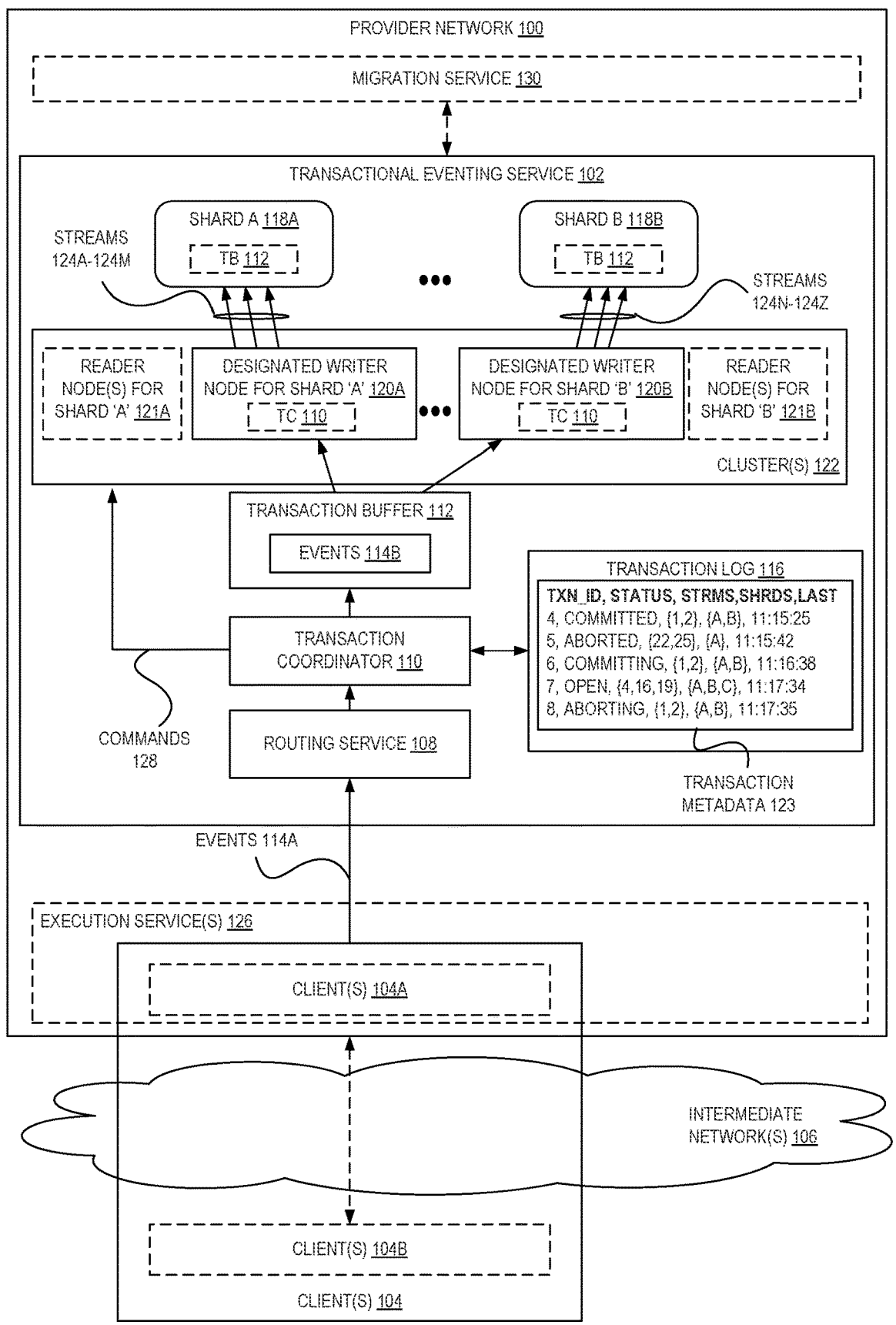
FIG. 1 is a diagram illustrating an environment for multi-stream transactional event processing in a distributed log-based append-only datastore according to some examples.

FIG. 1 is a diagram illustrating an environment for multi-stream transactional event processing in a distributed log-based append-only datastore according to some examples. In FIG. 1, a transactional eventing service 102 and optional migration service 130, among possibly one or more execution services 126, are implemented using software, hardware, or a combination of software and hardware in a multi-tenant "cloud" service provider network 100. Each service may be implemented in a distributed manner, using multiple computing devices located in one or multiple data centers, autonomous zones (AZs), regions, or the like.

A provider network 100 (or, "cloud" provider network) provides users with the ability to use one or more of a variety of types of computing-related resources such as compute/execution resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc.

The users (or "customers") of provider networks 100 can use one or more user accounts that are associated with a customer account, though these terms can be used somewhat interchangeably depending upon the context of use. Users can interact with a provider network 100 across one or more intermediate networks 106 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

Thus, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographic area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Typically, AZs within a region are positioned far enough away from one another so that a natural disaster (or other failure-inducing event) should not affect or take more than one AZ offline at the same time.

Users can connect to an AZ of the cloud provider network via a publicly accessible intermediate network 106 (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

To provide these and other services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource, for example, by submitting code to be executed by the provider network (e.g., by an on-demand code execution service), which in turn uses one or more compute resources to execute the code—typically without the user having any control of or knowledge of the underlying compute instance(s) involved.

Accordingly, clouds provider networks 100 may implement one or more execution services 126, such as an on-demand code execution service, hardware virtualization service, container service, or the like.

An on-demand code execution service (referred to in various examples as a function compute service, functions service, cloud functions service, functions as a service, or serverless computing service) can enable users of a provider network 100 to execute their code on cloud resources without having to select or manage the underlying hardware resources used to execute the code. For example, a user can use the on-demand code execution service by uploading their code and use one or more APIs to request that the service identify, provision, and manage any resources required to run the code.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output (I/O) virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

A container service can be a container orchestration and management service (referred to in various implementations as a container service, cloud container service, container engine, or container cloud service) that allows users of the cloud provider network to instantiate and manage containers. In some examples a container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

Turning more specifically to the transactional eventing service 102, safety guarantees provided by transactions are often described by the well-known acronym ACID, which stands for Atomicity, Consistency, Isolation, and Durability. The term was coined in an effort to establish precise terminology for fault-tolerance mechanisms in databases.

ACID atomicity describes what happens if a client 104 wants to make several writes to a datastore, but a fault occurs after some of the writes have been processed—for example, a process crashes, a network connection is interrupted, a disk becomes full, or some integrity constraint is violated. If the writes are grouped together into an atomic transaction, and the transaction cannot be completed (or "committed") due to a fault, the transaction is aborted and any writes it has made so far in that transaction are discarded.

Isolation in the sense of ACID means that concurrently executing transactions are isolated from each other, and thus cannot "step on each other's toes." The classic textbook definition formalizes isolation as serializability, which means that each transaction can pretend that it is the only transaction running, and when transactions have committed, the result is the same as if they had run serially (one after another) even though they may have run concurrently. The transaction isolation level controls the amount of information that is visible to observers during a transaction, and with serializable isolation, it appears that transactions run serially, isolated from each other, and therefore helps achieve a consistent view of data across transactions.

In some examples, the transactional eventing service 102 stores and arranges data using "shards" and "streams." A shard represents a boundary for ordering guarantees and concurrency control. Within a shard, events are ordered and version locking can be enforced as needed.

A stream is a uniquely identified sequence of events hosted on a shard. Multiple streams may be mapped to a single shard. A routing service 108 in the transactional eventing service 102 is responsible for assigning streams to a shards, and for routing write requests to a "designated writer" node for a particular shard. A designated writer is node (e.g., a virtual machine, process, thread, etc.) typically in a cluster of nodes that is responsible to write events to a shard. A designated writer can be elected via a leader election protocol, and there may only be one active designated writer for a shard at any point in time.

In some examples, as described herein, the transactional eventing service 102 utilizes optimistic concurrency control (OCC) as one part of providing multi-stream transactionality. OCC is a concurrency control technique applied to transactional systems, which assumes that multiple transactions can frequently complete without interfering with each other. While running, individual transactions can use data resources without acquiring locks on those resources. Before committing, each transaction verifies that no other transaction has modified the data it has read. If the check reveals conflicting modifications, the committing transaction rolls back and can be restarted. However, it is often the case that no other transaction has modified the data it has read, so the transactions can be performed in these cases very quickly with minimal overhead.

As indicated herein, a core aspect of streams, which are logical groupings of events, is that they provide a unit of transactionality. For example, a stream could pertain to events for a particular application, or customer, or function of an application, and it is relatively straightforward to provide transactionality for these streams as they may often be mapped to a single shard and various accesses to its data can be quickly and easily monitored. However, it may be the case that applications need to perform transactions involving multiple streams, which may be mapped to multiple shards and may be distributed across potentially a number of different processing nodes. In these cases, implementing ACID transactionality becomes much more difficult and resource intensive, for example, using complex two-phase commit (2PC) procedures.

In examples described herein, the transactional eventing service 102 can guarantee to applications that events produced to one or more streams spanning over one or more shards (and possibly in multiple shards that are distributed in nature)—either grouped together or produced as several individual events within a transaction—will persist or fail as one single unit. Thus, in some examples, event producers can be assured the ability to produce several individual events, within a transaction, across multiple streams which can support saga without requiring producer-compensating actions.

In current distributed systems, users with transactional applications needing ACID transactionality may need to constrain such writes to streams on a single shard, which limits applications to need to map all streams that are required to participate in a transactional write to a single shard. However, if applications are required to distribute those streams across multiple shards for any of a variety of reasons—such as achieving higher throughput than what can be supported by a single shard, isolating streams by data classification and compliance etc.—these users typically cannot run the transactional workloads that they need to atomically write to those streams. Consider an e-commerce application having two different streams for (1) inventory and (2) orders, which are spread over two different shards. To correctly process a customer order, the application would need to run a workflow that decrements the inventory and creates the order, which requires writing events atomically across two different shards. Another use case for atomic writes is moving money from one account to another, where one account is on one shard and the other account on another shard. To make this transaction, the application would need to write to two different shards atomically within a transaction; however, this is not supported in existing systems due to the need to implement complex 2PC procedures in such distributed systems, which would not be suitably performant.

In examples described herein, the transactional eventing service 102 supports serializable isolation between transactions across one or more stream spanning over one or multiple shards, ensuring that if a write collision is detected among several concurrent transactions, only one of them is allowed to commit.

Further, if an "aggregate" state is modified outside of a transaction while the transaction is in progress, the transaction will be aborted. An aggregate is a well-known pattern in Domain-Driven Design (DDD), where an aggregate is a cluster of domain objects that can be treated as a single unit. An example may be an order and its line-items; these may be separate objects, but it is often useful to treat the order (together with its line items) as a single aggregate. Thus, in examples described herein, if there are more customers attempting to buy items than there is inventory, the ideal final outcome is that all of the inventory will be sold, and no more. In contrast, if multiple customers attempt to purchase an item at the same time without such serializable isolation provided by the examples disclosed herein, two parallel transactions may see that available inventory is "1" and both process their orders, which results in the negative outcome of an overselling of the inventory.

Serializable isolation is the strongest isolation level that guarantees that transactions have the same effect as if they ran serially (i.e., one at a time without any concurrency). Serializable isolation protects against all concurrency side effects caused by intermingled read and write of events across two or more concurrent transactions including dirty reads, dirty writes, non-repeatable reads, write skew, and phantoms.

With such support for atomicity and isolation properties as described herein, event producers can send a batch of events to one or more streams spanning over one or more shards in an all-or-nothing manner that is isolated with other concurrent transactions. This guarantees that all events in a batch are eventually visible to any observer (including other transactions) of those streams, or that none are ever visible to any observer. Users can thus build applications that rely on atomicity and isolation properties of transactions to achieve consistency by enforcing application's notion of invariants—for example, in an accounting system, credits and debits across all accounts must always be balanced.

One classic example of where atomicity is required is in a banking payments system, where a transfer of funds from one account to another account must happen atomically, even if the two accounts are stored on different shards. Assume account holder A wants to send money from an account A to an account B; thus, the operation of both subtracting money from account A, and adding it to the account B, must be treated as one indivisible call, and if the second operation is rejected, the first calculation must be rolled back too. Thus, it is always all-or-nothing—either both updates occur, or none occur. Thus, in some examples, an account service (e.g., client) receives a request to transfer money from account A to B, and in processing the request it bundles up two events—"MoneyAdded" and "MoneySubtracted" into a transaction and asks the transactional eventing service 102 to write them atomically across two different streams (e.g., AccountA and AccountB streams), even if the two accounts are stored on different shards.

In some examples, the transactional eventing service 102 provides transactional support that, at a high level, utilizes a combination of optimistic and pessimistic concurrency mechanisms to manage transactions. During a first stage of a transaction, examples apply pessimistic concurrency control to lock-in events in a transaction from being observed outside the client that started the transaction until they are committed or aborted. In the second and final stage of a transaction, examples apply optimistic concurrency control to commit events in a transaction only if there are no write collisions and event condition violations detected on all shards involved in a transaction.

As shown in FIG. 1, the transactional eventing service 102 includes a routing service 108, a transaction coordinator 110, a transaction buffer 112, and one or more clusters 122 of nodes 120-121 for reading and/or writing to shards 118A-118B. The nodes 120-121 may, in some examples, take on different roles such as being elected/configured as a designated writer for a shard (e.g., node 120A), or generally for reading (e.g., node 121A), though a "reader" type node can become a designated writer, for example, in the event of a failure of the "old" designated writer. In some examples, the one or more clusters 122 are distributed in that they are implemented on different virtual machines and/or computing devices, potentially in different physical locations (e.g., racks, rooms, buildings, cities, data centers, or the like). As one use case, the transactional eventing service 102 may be utilized by a migration service 130, e.g., to migrate applications (e.g., from a user's on-premise environment, from a separate cloud provider network, or from within the cloud provider network) into the provider network 100, which may include changing a type of storage system used by an application, e.g., from a relational database to a log-based append-only type of system such as one provided by a transactional eventing service 102.

In some examples, a "front end" routing service 108 includes one or more nodes that receives events/requests (e.g., to read from and/or write to streams 124A-124Z), and "routes" them to an appropriate location for processing, such as by selecting a transaction coordinator 110 and sending the requests to it.

The transaction coordinator 110, which is somewhat similar to those used in 2PC systems, can maintain the lifecycle of a transaction and prevent a transaction from having an incorrect status. The transaction coordinator 110 manages transactions of events sent by producers (e.g., an internal client 104A, implemented in an execution service 126 of the provider network 100, and/or an external client 104B deployed in a separate network or location) and commit or abort the operations as a whole. The transaction coordinator 110 can be implemented as a distinct service (e.g., as a standalone microservice, component, virtual machine, or the like), or can be implemented as part of (e.g., as a set of one or more software modules) one of the designated writer nodes (e.g., designated writer node 120A), as the designated writer controls event admission.

The transaction coordinator 110, in some examples, maintains metadata identifying the shard and/or streams that are part of (or "participate in") a transaction. When a transaction is committed, the transaction coordinator 110 interacts with the relevant shards and their designated writers to complete the transaction.

In some examples, the transaction coordinator 110 persists this transaction metadata 123 in a persistent storage (e.g., a transaction log 116) for durability and recovery. The transaction log 116 stores the transaction status metadata, rather than the actual event data in the transaction, as the actual events may be stored in the actual streams. If and when the transaction coordinator 110 crashes, it can restore the transaction metadata from the transaction log 116. In this example, the transaction metadata 123 includes, for a transaction, a transaction identifier/ID (shown as TXN_ID), transaction status, set of involved streams, set of involved shards, a last update time, etc., though in various examples more, fewer, and/or different values can be tracked. The transaction log 116, in various examples, can be implemented using a key-value store, a lightweight relational database, plain-text files, or other data structure that can be updated and persisted.

In some examples, each transaction is assigned a unique transaction ID, e.g., by the transaction coordinator 110. If a transaction crash occurs (e.g., due to exceeding a timeout limit) or a new transaction coordinator 110 is elected, the transaction can thus be located using the unique transaction ID durably persisted in the transaction log 116.

In some examples, events 114B produced within a transaction are stored in a transaction buffer (TB) 112. The transaction buffer 112 may store events 114B of all ongoing and optionally all aborted transactions. The events in the transaction buffer 112 may be durably stored so that they are not lost in the event of a transaction coordinator 110 crash or when a new transaction coordinator 110 is elected. When a transaction is aborted, the messages in the transaction buffer 112 may be discarded. The events 114B in the transaction buffer 112 will not be visible to any observers except the observer (e.g., client 104) that started the transaction until the transactions are committed. Further details are provided below to detailing example mechanisms for making uncommitted messages visible to the consumer that started the transaction. In some examples, the shards 118A-118B can be reused as the transaction buffer, or in other examples a separate/distinct shard can be used for it. Different implementation approaches along with their benefits and trade-offs are discussed later herein.

Figure 2:
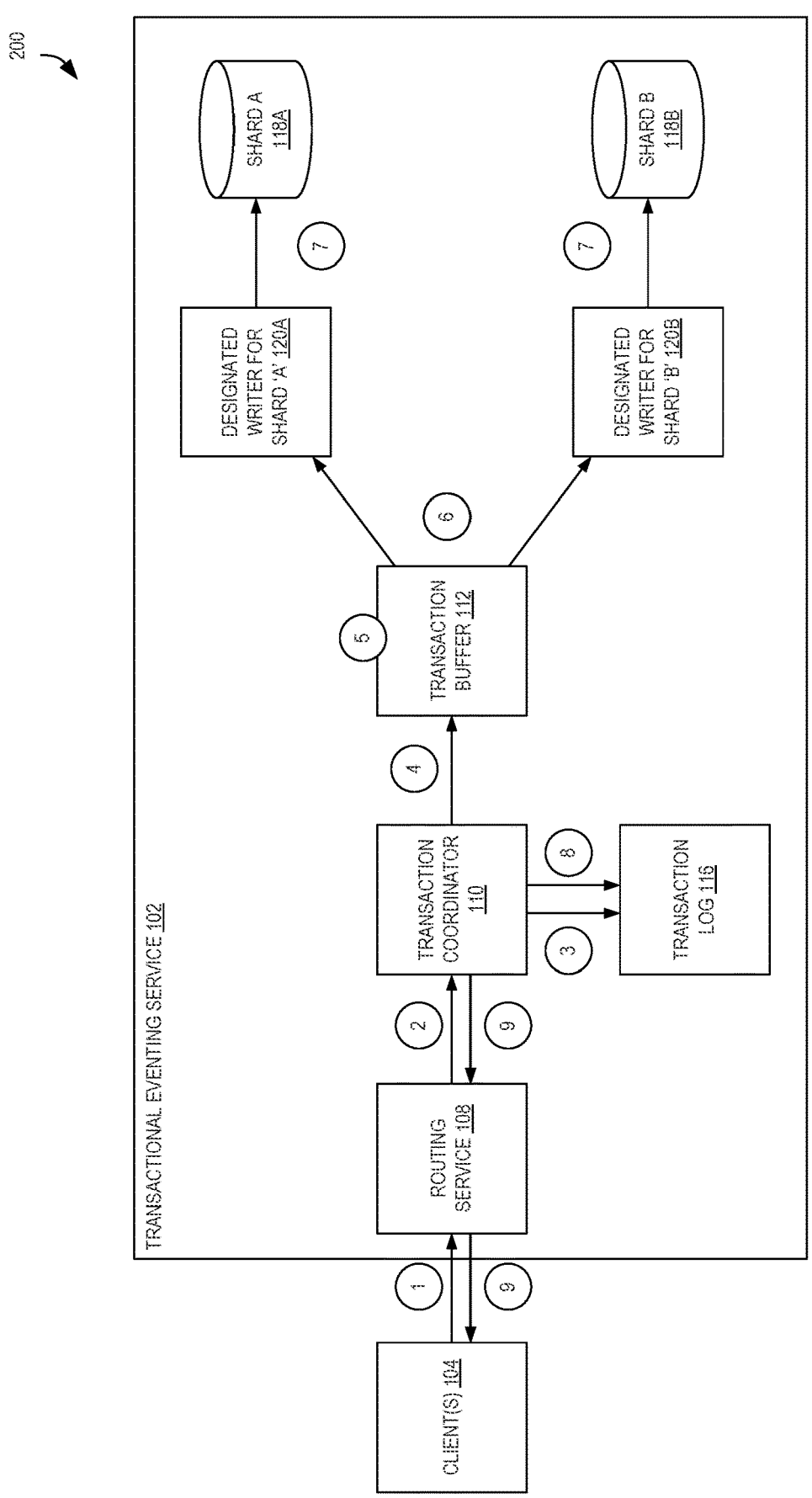
FIG. 2 is a diagram illustrating operations for performing transactional writes in a distributed log-based append-only datastore according to some examples.

FIG. 2 is a diagram illustrating operations 200 for performing transactional writes in a distributed log-based append-only datastore provided by a transactional eventing service according to some examples. In this figure, each arrow represents the request flow or event flow. These operations occur in sequence indicated by the circled numbers illustrated next to each arrow.

At circle (1), a client 104 sends one or more transaction request messages specifying one or more of a transaction timeout value (e.g., a maximum amount of time that the transaction coordinator 110 is to wait for a transaction to be completed by the client before proactively aborting the ongoing transaction), a set of stream IDs participating in the transaction, an aggregate identifier, and/or events with optional logical conditions indicating whether the events should or should not be accepted. For example, a condition could indicate that an item (corresponding to one in an event) must exist or must not exist prior to the transaction being performed, or that a particular aggregate (e.g., an abstraction corresponding to a collection of objects) must or must not exist, and/or that another object must exist or not exist, etc.

At circle (2), the request is dispatched by the routing service 108 to a transaction coordinator 110 responsible for the transaction, e.g., one belonging to a particular stream or shard that is associated with the transaction or user. At circle (3), the transaction coordinator 110 allocates a transaction ID for the transaction, which is persisted in the transaction log 116 with a status value of "OPEN," along with other metadata such as identifiers of the participating stream IDs, shard IDs, etc. At circle (4), the actual events associated with the transaction are sent to be stored in the transaction buffer 112, and at circle (5), events in the transaction buffer 112 participating in an ongoing transaction are locked from being observed in other transactions until the ongoing transaction is completed or aborted, which may include setting a particular lock value that is associated with these events, though other techniques can be used. The transaction coordinator 110 can be responsible to enforce this serializable isolation between transactions.

At circle (6), the transaction coordinator 110 can interact with the relevant shards and their designated writers (e.g., by sending commands 128) to commit the events in the transaction buffer 112, e.g., by updating records or writing records for the events to the shards 118A-118B as reflected by circle (7). If write conflicts exist, due to another ongoing transaction being in the process of updating the same events as detected via a built-in OCC mechanism, or due to a condition supplied in one of the event condition expressions not being met, the transaction can be aborted and the corresponding events in the transaction buffer 112 may be discarded. At circle (8), after all produced events to all shards 118 are committed or aborted, the transaction coordinator 110 updates the final transaction status message (e.g., COMMITTED or ABORTED) in the transaction log 116 indicating that the transaction is complete, and at circle (9) the client 104 is notified about the final transaction status.

Figure 3:
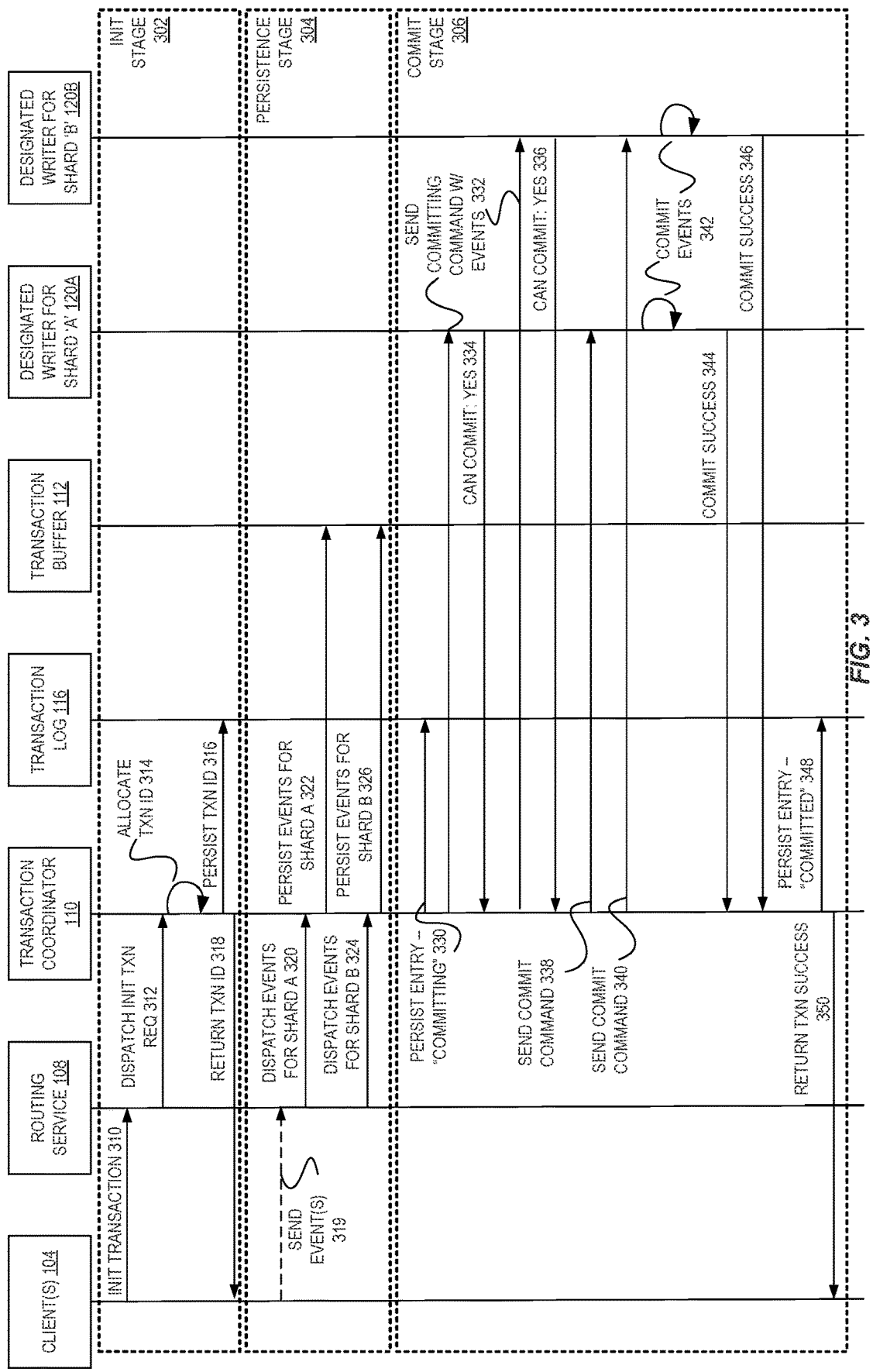
FIG. 3 is a sequence diagram illustrating operations for performing transactional writes in a distributed log-based append-only datastore according to some examples.

For further detail, FIG. 3 is a sequence diagram illustrating operations for performing transactional writes in a distributed log-based append-only datastore according to some examples. This example includes an initialization phase 302, a persistence stage 304, and a commit stage 306, though other examples can use more or fewer or different stages. At 310, the client 104 may send an initialize (init) transaction request message to the routing service 108, indicating a request to begin a transaction and indicating one or more relevant pieces of metadata, such as the involved stream IDs, admission conditions, etc., as described herein. At 312, the routing service 108 sends a dispatch of the init transaction request to a transaction coordinator 110 (e.g., selected due to its association as being the transaction coordinator 110 for a shard associated with one of the involved streams).

At 314, the transaction coordinator 110 allocates a transaction identifier for the transaction (e.g., by selecting a next numeric transaction identifier in a sequence, etc.) and at 316 persists the transaction identifier in the transaction log 116, e.g., along with other relevant transaction metadata, such as the associated stream ID(s), shard ID(s), a last updated time, etc. At 318 the transaction identifier is returned to the client 104 for further use.

In some cases where the transaction events were not already sent along with the init transaction request, these events may be sent via one or multiple messages at 319. As part of the persistence stage 304, at 320 and 324, the routing service 108 sends the events to the transaction coordinator 110, which in turn sends the events to be persisted to the transaction buffer 112 at 322 and 326.

In a commit stage 306, the transaction coordinator 110 may attempt to commit the events of the transaction. The transaction coordinator 110 may update a transaction status of the metadata entry for the transaction in the transaction log 116 to be "committing" at 330. The transaction coordinator 110 also sends a "committing" command as shown at 332 to each identified designated writer for the involved shards in the transaction—here, designated writer for shard 'A' 120A and designated writer for shard 'B' 120B. Each designated writer 120 thus determines whether it is possible to commit the events of the transaction from its perspective, e.g., by determining if there are other writes or accesses to the events it needs to update. If everything is able to be written, each designated writer 120 returns a positive indication that all is good, shown as "can commit yes" at 334 and 336.

When all responses back are positive, as shown here, the transaction coordinator 110 can send a "commit" command 338 and 340 to the involved designated writers 120, which commit the events at 342, and return success messages at 344 and 346. Thus, the transaction coordinator 110 can update the transaction status in the transaction log 116 (e.g., to "committed", possibly along with other metadata updates such as updating a last update time) at 348 and return an indication of the status (e.g., success) to the client 104.

Alternatively, as described herein, if one of the designated writers 120 could not commit its events, it could send back a "no" can commit response (e.g., instead of 336), whereby the transaction coordinator 110 can "abort" the write, e.g., by removing the events from the transaction buffer 112, updating the transaction status in the transaction log 116, returning a "failed" or "aborted" message to the client, etc., to cause none of the events to be committed.

As indicated herein, some examples support saga transactions. As is known in the art, a saga can be viewed as a sequence of local transactions, e.g., which may be invoked by multiple different clients as part of a common transaction. For example, an e-commerce application may have credit limits for customers, and the application must ensure that a new order will not exceed the customer's credit limit. In this case, the tracking of "orders" and that of particular "customers" may be tracked in completely different databases owned by different services, and thus, the application cannot simply use a local ACID transaction. Instead, a business transaction that spans multiple services can be defined as a saga, where each local transaction updates its database and publishes a message or event to trigger the next local transaction in the saga. If a local transaction fails because it violates a rule (e.g., a business rule) then the saga executes a series of compensating transactions that undo the changes that were made by the preceding local transactions. Such sagas can be supported by examples described herein.

One example use case is now described involving distributed transactions spanning over multiple microservices using saga without compensating actions. A simple e-commerce application could be decomposed into two microservices, "OrderService" and "InventoryService." A model for an example flow could be where the client is an e-commerce choreographer (process manager with specific responsibility of order processing but not a centralized orchestrator) that takes an order request from a customer, initiates a transaction with transactional eventing service 102, and sends a "PrepareOrder" command to the OrderService within the transaction context. This command merely indicates the intention to process an order and does not imply that the order processing has been successful. The OrderService receives the command, prepares to process the order by sending a "OrderProcessed" event to order stream within the same transaction context. This event gets stored in the Transaction Buffer. Next, the choreographer sends out a prepare command to the InventoryService to reserve the items. The InventoryService receives the command, prepares to process it and sends an "InventoryReserved" event to Inventory stream. This event also gets stored in the Transaction Buffer. The client (i.e., the e-commerce choreographer) initiated the transactions and therefore is allowed to observe events in the Transaction Buffer for that transaction. When the choreographer observes both events (not observable to other transactions at this time), it can send an "end transaction" request to the transactional eventing service 102, whereby the events in transaction buffer are persisted into the Order and Inventory streams by their respective designated writers. The OrderService and InventoryServices can thus materialize the order and inventory updates to their local views. If the choreographer doesn't observe the events within the transaction time out, it may send a request to abort the transaction, causing the transaction coordinator 110 to discard the transaction events stored in the transaction buffer and send the final transaction status back to the client.

Alternatively, in some examples, the transactional eventing service 102 can include a transaction orchestrator that can detect the beginning of a transaction and the end of a transaction, and thereafter commit the result. For example, a transaction orchestrator can be configured to identify and detect event patterns, such as through use of an observation period of time where particular patterns are identified as being part of a common transaction—e.g., an "Order" event together with an "Inventory" event and a "Payment" event—which may share some common aspects, such as being received within a particular period of time, originate from a particular set of sources, include some common data value, etc. Thus, in some examples, a transaction orchestrator can detect a particular event pattern (e.g., when detected with a threshold amount of certainty) and automatically commit them as a transaction, possibly without even requiring a transaction to be initiated by a service-external client in the first place.

Figure 4:
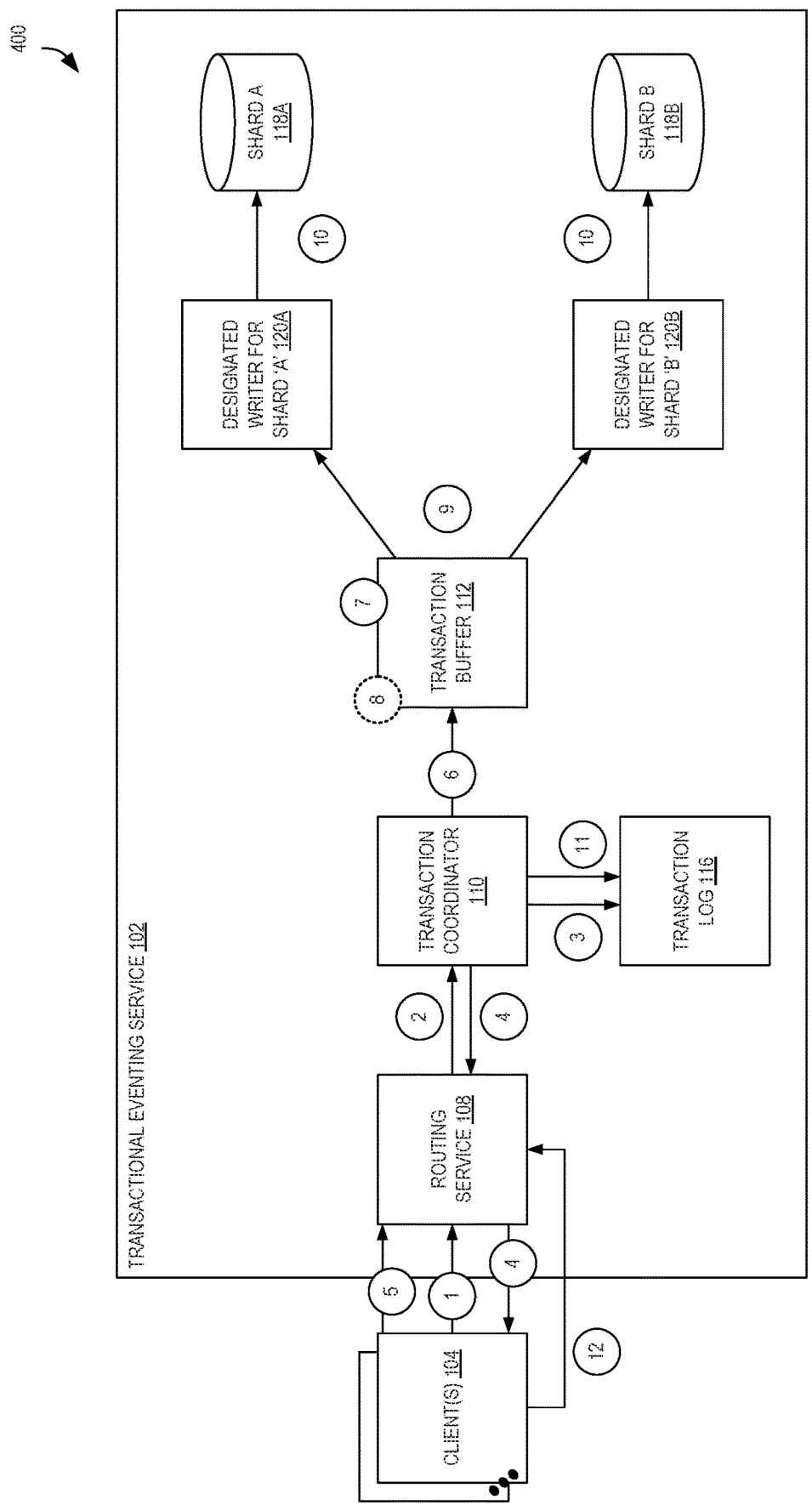
FIG. 4 is a diagram illustrating operations for performing saga-based transactional writes in a distributed log-based append-only datastore according to some examples.

FIG. 4 is a diagram illustrating operations 400 for performing saga-based transactional writes in a distributed log-based append-only datastore provided via a transactional eventing service 102 according to some examples. FIG. 4 shows saga distributed transactions flows involving different components. Each arrow represents the request flow or event flow. These operations occur in sequence indicated by the circled numbers illustrated next to each arrow, some of which correspond to operations described with regard to FIG. 2.

At circle (1), a client 140 sends a transaction request specifying metadata such as the transaction timeout (the maximum amount of time that the transaction coordinator 110 will wait for a transaction to be completed by the client before proactively aborting the ongoing transaction) participating streams IDs, etc., which is dispatched to the transaction coordinator 110 via the routing service 108 at circle (2).

At circle (3), the transaction coordinator 110 allocates a transaction ID for the transaction and persists it in the transaction log with a transaction status value (e.g., "OPEN") along with the participating streams IDs and perhaps other metadata. At circle (4), the transaction ID is returned back to the client (e.g., via the routing service 108) as response.

At circle (5), the client 104 starts sending events with optional conditions on which they should be accepted to the streams using a transactional eventing service 102 provided API. The events may also include (or be sent with) the transaction ID returned to the client previously, and if an event maps to a shard that's currently not participating in the transaction, it gets added to the transaction by the transaction coordinator 110, e.g., including a new shard ID in the transaction log 116 for that entry.

These events are stored in the transaction buffer 112 for the transaction at circle (6), and the transactional eventing service 102 provides a mechanism to the client that started the transaction to observe the existence of this data, e.g., it can issue queries to read from the shards and, for that particular client, the query processing may consider those events persisted in the transaction buffer 112, while other clients will not have such visibility. Thus, events in the transaction buffer 112 participating in an ongoing transaction are locked from being observed in other transactions until the ongoing transaction is completed. In some examples, the transaction coordinator 110 is responsible to enforce this serializable isolation between transactions.

After all events in a transaction are published at circle (7) and visible by the client that started the transaction (shown at circle (8), such via access control type mechanisms that allow or disallow the use/inclusion of events from the transaction buffer based on whether the client is associated with particular transactions), the client 104 (or another client participating in the transaction) sends an end transaction request to the routing service 108, which is again routed to the transaction coordinator 110, which interacts with the relevant shards via their designated writers (interactions not shown) to commit the events in the transaction buffer at circles (9) and (10).

If write conflicts are detected due to another ongoing transaction being in the process of updating the same events through the use of built-in OCC mechanism, or due to a condition supplied in one of the event condition expressions not being met, etc., the transaction is aborted, e.g., the events in the transaction buffer 112 are discarded.

After all produced events to all shards are committed or aborted via circles (9) and (10), the transaction coordinator 110 writes the final transaction status (e.g., COMMITTED or ABORTED) to its transaction log 116, indicating that the transaction is complete. At circle (11), the client 104 is notified about the final transaction status.

Figure 5:
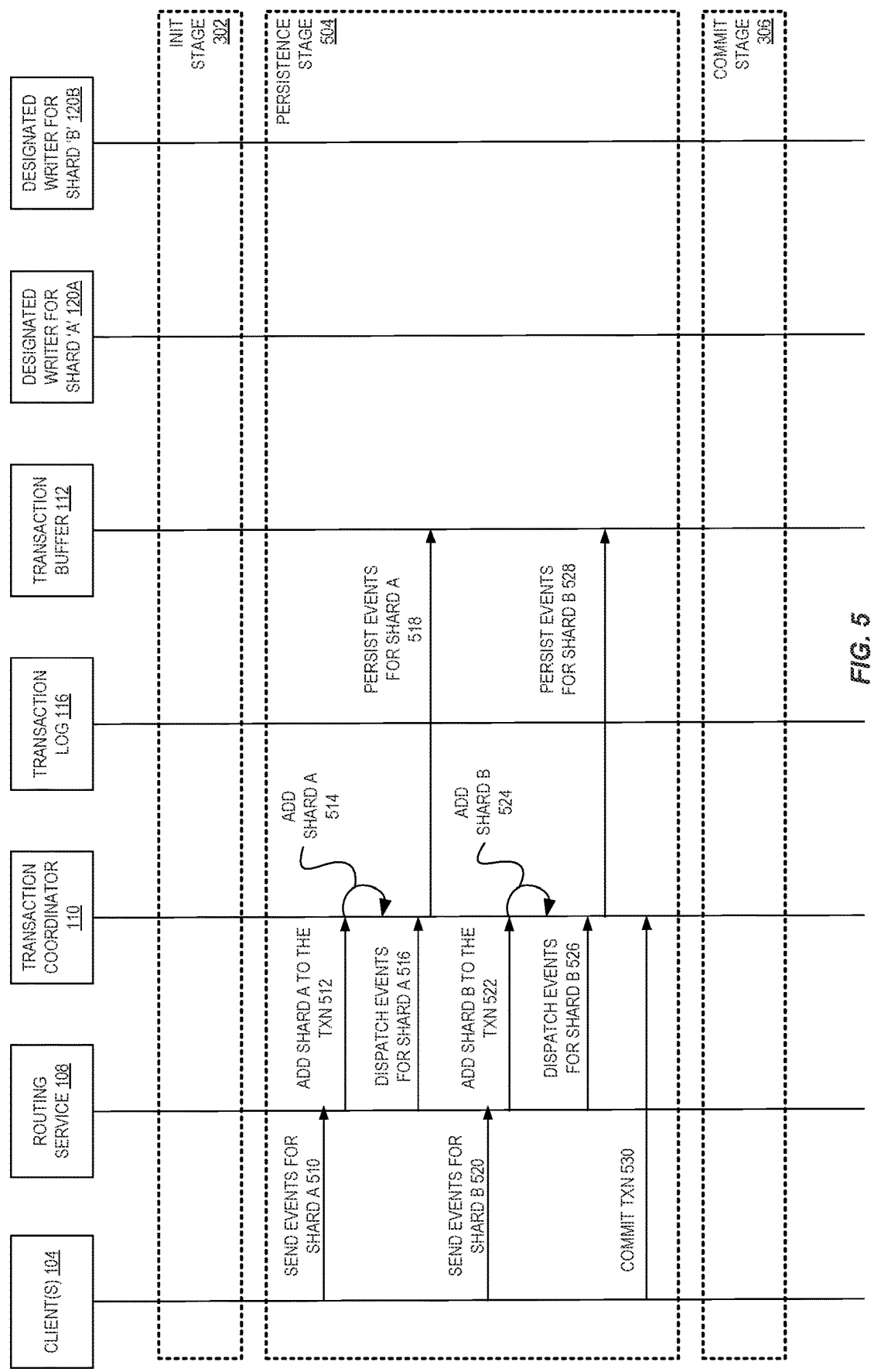
FIG. 5 is a sequence diagram illustrating operations for performing saga-based transactional writes in a distributed log-based append-only datastore according to some examples.

For further detail, FIG. 5 is a sequence diagram illustrating operations for performing saga-based transactional writes in a distributed log-based append-only datastore according to some examples. In this example, both the init stage 302 and commit stage 306 may operate very similar (or the same) as those stages presented with regard to FIG. 3; however, here the persistence stage 504 differs from persistence stage 304.

In this example, one or more clients 104 may send events for various shards, e.g., a set of events for a first stream of a first shard at 510. As these are the initial events associated with this particular shard for this particular transaction, the routing service 108 can detect this and at 512 a notification is sent to the associated transaction coordinator 110. This transaction coordinator 110 at 514 can add shard A to the transaction (e.g., by updating a set of involved shards for the event) in the transaction log 116, and thereafter the events are dispatched at 516 from the routing service 108 to the transaction coordinator 110, which persists these events at 518 in a transaction buffer 112.

Similarly, another one or more clients 104 (e.g., a separate component of an application, such as a microservice) may send a set of events for a second stream of a second shard at 520. As these are the initial events associated with this particular shard for this particular transaction, the routing service 108 can detect this and at 522 a notification is sent to the associated transaction coordinator 110 (which may be a same or different transaction coordinator). This transaction coordinator 110 at 524 can add shard B to the transaction (e.g., by updating a set of involved shards for the event) in the transaction log 116, and thereafter the events are dispatched at 526 from the routing service 108 to the transaction coordinator 110, which persists these events at 528 in a transaction buffer 112. Thereafter, one of the clients 104 may send a message to commit the transaction 530, which can proceed as described earlier with regard to the commit stage 306, where all involved shards determine whether they can write their changes (and thus the transaction is committed), and if not, the transaction can be aborted.

As indicated above, various components of these disclosed systems can flexibly and beneficially be implemented in a variety of ways.

The transaction coordinator is a component used to handle transactional requests from clients and to keep track of the status of these transactions. Each transaction coordinator can be identified by a unique identifier (e.g., transaction coordinator ID, or "TCID") and can maintain its own transaction log. The transaction log is used by a transaction coordinator for storing and managing all transaction metadata. The TCID may be used for identifying an instance of the transaction coordinator as well as for recovery from transaction coordinator failures. This TCID may be used for locating the transaction log associated with a transaction coordinator.

The transaction log, or "transaction metadata dictionary," can be implemented using a variety of types of data structures, including but not limited to a distributed key/value storage, using an in-memory map backed by a journal shard, etc. For an in-memory map implementations backed by a journal shard, the transaction coordinator runs a transaction id allocator used for generating transaction id values, and also may maintain a map from transaction id to its transaction metadata (stored in the transaction log). The transaction metadata may include values such as the transaction status, the list of streams and/or shards that this transaction is modifying, the last time when this status was updated, etc.

In some examples, the updates to the transaction metadata map will first be persisted to the transaction log so they can be used for recovery. Examples of the mapping data structure and the format of the transaction entry appended to the transaction log will be described later herein.

Transaction status updates in the transaction log can act as a synchronization point. For example, when writing a status of "COMMITTING" or "ABORTING" in metadata followed by append to the transaction log, the transaction is guaranteed to be committed or aborted. Even if the transaction coordinator fails, the transaction can be rolled forward or back upon recovery.

The transaction coordinator can finalize the transaction by committing or aborting events on all the shards involved in a transaction. The committing action can happen multiple times due to failures (such as transaction coordinator retries after recovery, network disconnections etc.). The timestamp in the transaction metadata entry can be used for determining when the transaction has timed out. Once the difference of the current time and the transaction start time has exceeded the transaction timeout value, the transaction can be aborted.

Transaction Status Values

Various transaction status values can be used. In one example, the transaction coordinator manages a transaction's lifecycle moving through the following transaction statuses:
 OPEN: The transaction is open and thus the transaction is ongoing
 COMMITTING: transaction coordinator is committing the transaction
 COMMITTED: The transaction has been committed and the metadata of the transaction can be removed from the transaction metadata dictionary
 ABORTING: transaction coordinator is aborting the transaction
 ABORTED: The transaction has been aborted and the metadata of the transaction can be removed from the transaction metadata dictionary Transaction Coordinator Startup Upon the startup of a transaction coordinator, the following operations may be executed. First, the transaction coordinator is assigned with a TCID during startup, and the transaction coordinator opens its transaction metadata dictionary to locate its currently assigned transaction log. The transaction coordinator replays its assigned transaction log from the beginning to materialize the entries to an in-memory metadata dictionary.

During this replay, when committing a transaction, the transaction coordinator sends an "end transaction" command with a "COMMIT" action to all shards participating in the transaction. After receiving all the responses, the transaction coordinator appends an entry in the transaction log to change the transaction status to COMMITTED. Moreover, when aborting a transaction, the transaction coordinator sends "end transaction" commands with an "ABORT" action to all shards participating in the transaction, and after receiving all the responses, it appends an entry in the transaction log to change the transaction status to ABORTED.

When committing or aborting a transaction, if one of the shards involved in the transaction become unavailable, the transaction will be unable to completed. Though this may delay the committing of events from the transaction buffer to the actual shards, it does not block consumers on consuming already committed events from those shards.

Transaction Coordinator Request Processing

In some examples, when the transaction coordinator receives a new transaction request, the following operations may be executed. An in-memory transaction ID counter is incremented, named local transaction ID. A transaction id can be generated using a combination of TCID and a locally incremented ID. A Transaction MetadataEntry with transaction id and "OPEN" transaction status with list of streams and shards participating in the transaction is logged into the transaction log. The transaction coordinator may then respond to the client with the transaction ID.

In some examples, when the transaction coordinator receives an end transaction request from the client, the following steps are executed. First, if the transaction ID does not exist in transaction metadata dictionary, it responds with a "transaction not found" error message. Otherwise, if there is already an entry found in the transaction metadata dictionary, the transaction coordinator can check its status. If the status is OPEN the transaction coordinator can continue on to a commit/abort step detailed below. However, if the status is COMMITTING or COMMITTED, and the action from the request is COMMIT, then the transaction coordinator may return a success message. If the status is ABORTING or ABORTED, and the action from the request is ABORT, then the transaction coordinator may return a success message. Otherwise, the transaction coordinator may return a reply message with transaction metadata error.

Next, the transaction coordinator constructs a transaction metadata entry and updates the transaction status according to the action from the request. If the action is a COMMIT action, it changes the transaction status to COMMITTING. If action is an ABORT action, it changes transaction status to ABORTING.

The transaction coordinator then appends the transaction metadata entry to the transaction log, updates the in-memory map upon successfully appending the entry, and responds with a success message to the client.

Finally, the transaction coordinator may commit or abort the transaction based on the action from the request by flushing or dropping events from the transaction buffer.

The designated writer node, upon receiving the COMMITTING requests, attempts to obtain locks for all of the events participating in the transaction belonging to that shard. If it can successfully do this, it can guarantee that there are no conflicting transactions, and even in the case of a crash, the cluster node can recover all the required state to complete the transaction. When the designated writer node receives the COMMIT request from the transaction coordinator, it is safe to write all of the changes to the shard. The designated writer node writes all of the events to the shard and releases all the acquired locks.

When a client crashes and never comes back or the transaction coordinator is unable to flush events in the transaction buffer to shards beyond the transaction timeout duration, the transaction coordinator may proactively expire the transactions initiated by this client.

To achieve this, the transaction coordinator can periodically scan the transaction metadata dictionary and execute the following. If a transaction is in OPEN state, and it has passed its provided transaction timeout duration, the transaction coordinator expires it by updating the transaction metadata entry to ABORTING state and executing the aborting steps to abort the transaction. Instead, if a transaction is in COMMITTING state, then the transaction coordinator can complete the committing process for this transaction. This can happen when a transaction coordinator crashes at the middle of completing the committing process. Additionally, if a transaction is in ABORTING state, then the transaction coordinator can complete the aborting process for this transaction. (This can happen when a transaction coordinator crashes at the middle of completing the aborting process.)

Transaction Coordinator Deployment

The transaction coordinator can be deployed into multiple instances and as mentioned previously it can be a part of the designated writer. In implementations running the transaction coordinator as part of a designated writer node, all the transaction logs for transaction coordinators can be modeled as one dedicated shard. The number of transaction coordinators determines the number of streams in this transaction log shard. Each transaction coordinator obtains one stream to start. In some examples, streams are already managed and mapped to shards by the transactional eventing service, so when a stream of the transaction coordinator transaction log shard is assigned to a designated writer, the designated writer knows the shard ID and can use the shard ID as TCID to start up.

Transaction Buffer

In traditional 2PC mechanisms, a transaction buffer is not used. The 2PC protocol implementation in ACID compliant databases instead relies on underlying primitives of databases to acquire read/write locks on tables, partitions or items participating in a transaction, and on Write-ahead logging (WAL) for reverting them to a previous state when a transaction is aborted and to recover from failures. During a transaction rollback, updates made by the transaction are undone using the undo log, and the resources and locks held during the transaction are released.

In examples described herein, however, shards are append-only in nature and do not allow for direct updates of the events that are already committed as part of undo process during a transaction rollback. This inherent characteristic of any log-based data management makes aborting a transaction difficult to implement correctly, which is required to support atomicity. In addition, if the events for an ongoing transaction are directly committed to actual shards instead of the transaction buffer, the events committed will become observable to all consumers while the transaction is ongoing, which may result in concurrency issues due to the intermingled read and write of events across two or more concurrent transactions (serializable isolation violation) and incorrect and premature materialization of events by consumers.

The transaction buffer (TB) described herein solves both of the problems described above. Examples using a transaction buffer thus utilize a strategy to make events produced within a transaction unobservable to other consumers until the transaction is committed while durably persisting them in a shard. The transaction buffer can thus work with the transaction coordinator to selectively make uncommitted events of an ongoing transaction observable by the client that started the transaction. This allows for the support of saga-based distributed transactions without compensating actions.

In addition, use of the transaction buffer tackles another subtle issue of not allowing any event write to happen at a higher version than the ones in the transaction buffer for the streams participating in an ongoing transaction. The transaction coordinator and designated writers observe the transaction buffer for streams participating in an ongoing transaction and can compare latest event version with the incoming event version to reject write request for those events for which the incoming event version is at a higher version compared to ones in the transaction buffer. This covers the case when all designated writers for shards participating in a transaction send confirmation to the transaction coordinator that they are ready to commit but at least one of them go unresponsive during the final commit of events to the shards. This is a point of no return as the designated writer that went unresponsive has promised to the transaction coordinator that it will definitely be able to commit later and that decision must be enforced, no matter how many retries it takes. Thus, the transaction will be committed when the designated writer recovers or a new one is elected. This check will ensure that the event versions on the unresponsive shard don't move further than the ones in the transaction buffer and can be committed safely when the unresponsive designated writer becomes healthy. This ensures that during the commit phase the designated writer picks up the event versions at the time of transaction across the set of participating shards, making sure that the transaction event write will succeed during retries after any failures.

The transaction buffer can flexibly be implemented in multiple ways. For example, the buffer can be shards participating in transaction itself, a separated "sidecar" transactional eventing service managed shard, or another implementation.

Use of Shards Participating in Transaction as the Transaction Buffer

One approaches to implement the transaction buffer is to reuse the shards participating in a transaction as the transaction buffer. In this approach, transactional events are appended directly to the shards participating in a transaction, but consumers are not allowed to observe them until the transaction is committed. Additional metadata (e.g., a transaction id) is added to the events when they are produced for materialization (e.g., to clients). The materializer checks this metadata and also the transaction status to decide whether it should materialize them.

In one example, when the transaction coordinator begins committing or aborting the transaction, it writes a <txn>-commit or <txn>-abort to the shard to mark the transaction as COMMITTED or ABORTED. At this point, the events of COMMITTED transactions are safe to be materialized for consumers, and the events of ABORTED transactions are ignored during materialization.

Figure 6:
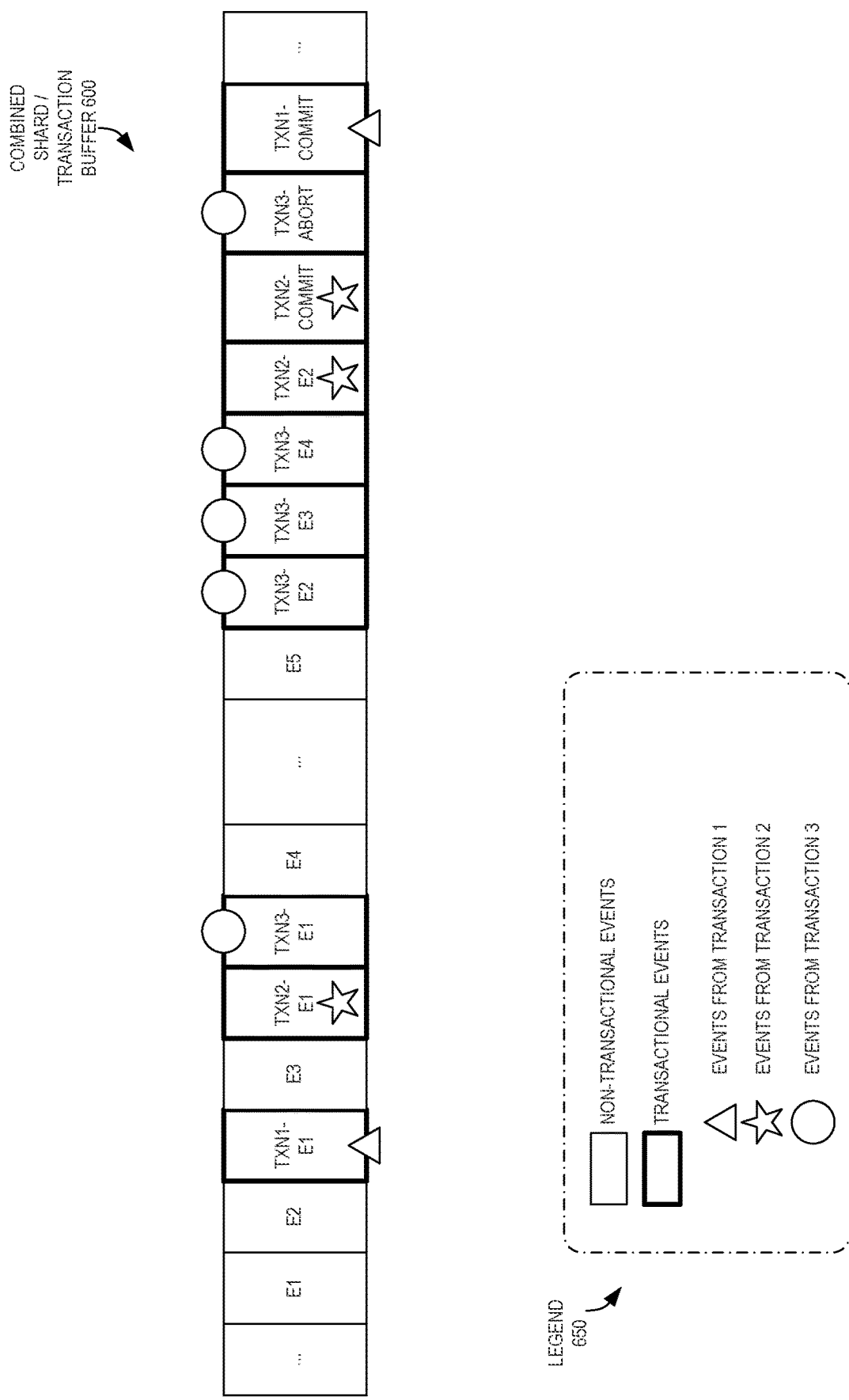
FIG. 6 is a diagram illustrating an example technique for reusing shards participating in a transaction as a transaction buffer in a distributed log-based append-only datastore according to some examples.

For example, FIG. 6 is a diagram illustrating an example technique for reusing shards participating in a transaction as a combined shard/transaction buffer 600 in a distributed log-based append-only datastore according to some examples. As indicated by legend 650, in this example the regular thin-lined boxes (e.g., "E1" and "E2") represent non-transactional events, whereas the boxes with thick lines represent events produced by transactions. The different shapes (triangle, star, and circle) overlaid on these transactional event boxes indicate different transactions; here the triangle events pertain to a first transaction, the star events pertain to a second transaction, and the circle events pertain to a third transaction.

Each event produced by a transaction can be labelled as <txn>-<event> (e.g., txn2-e2). Further, <txn>-commit or <txn>-abort are the marker events appended when committing or aborting a given transaction. The commit marker records the related event-id list of its transaction. When the materializer read a transaction marker, it gets the events of the transaction by event-id list in the marker and materializes them for consumers. In this example, out of three depicted transactions (txn1, txn2, and txn3), both txn1 and txn2 are committed, while txn3 is aborted.

As introduced, "<txn>-commit" is the commit marker used in some examples for marking the transaction as COMMITTED and when materializing the events to the consumers. It is also a fencing point for the transaction—any events produced to the same transaction after this marker are rejected. Because a transaction can be spread over multiple events, a mechanism for indexing the events for the transaction is needed. Hence when the materialization happens, the materializer knows how to fetch the events and read them correctly. Examples thus maintain a mapping between transaction ID and a list of event IDs of its events. Thus, when a transaction coordinator commits a transaction, it adds to the list the event ID of the transaction as part of the commit marker, writes the commit marker to the shard, and when the marker is successfully written, removes the mapping between transaction ID and list of event IDs associated with it, as the transaction has already been materialized.

<txn>-abort is the commit marker used for marking the transaction as ABORTED. Once a transaction is marked as ABORTED, the events of the transaction are safe to be removed. However, because the shards are append-only, there is no way for deleting individual events from the shard. So, the events are not easy to remove. These events are thus ignored for materialization but have to wait until a retention period expires for the shard. In addition, because transactional events (both committed and aborted events) are interleaved with normal events, care should be taken by the materializer on reading the events, as the cursor may not be moved forward if the transaction that an event belongs to is not finalized (committed or aborted) yet.

Use Separate Shard as the Transaction Buffer

Figure 7:
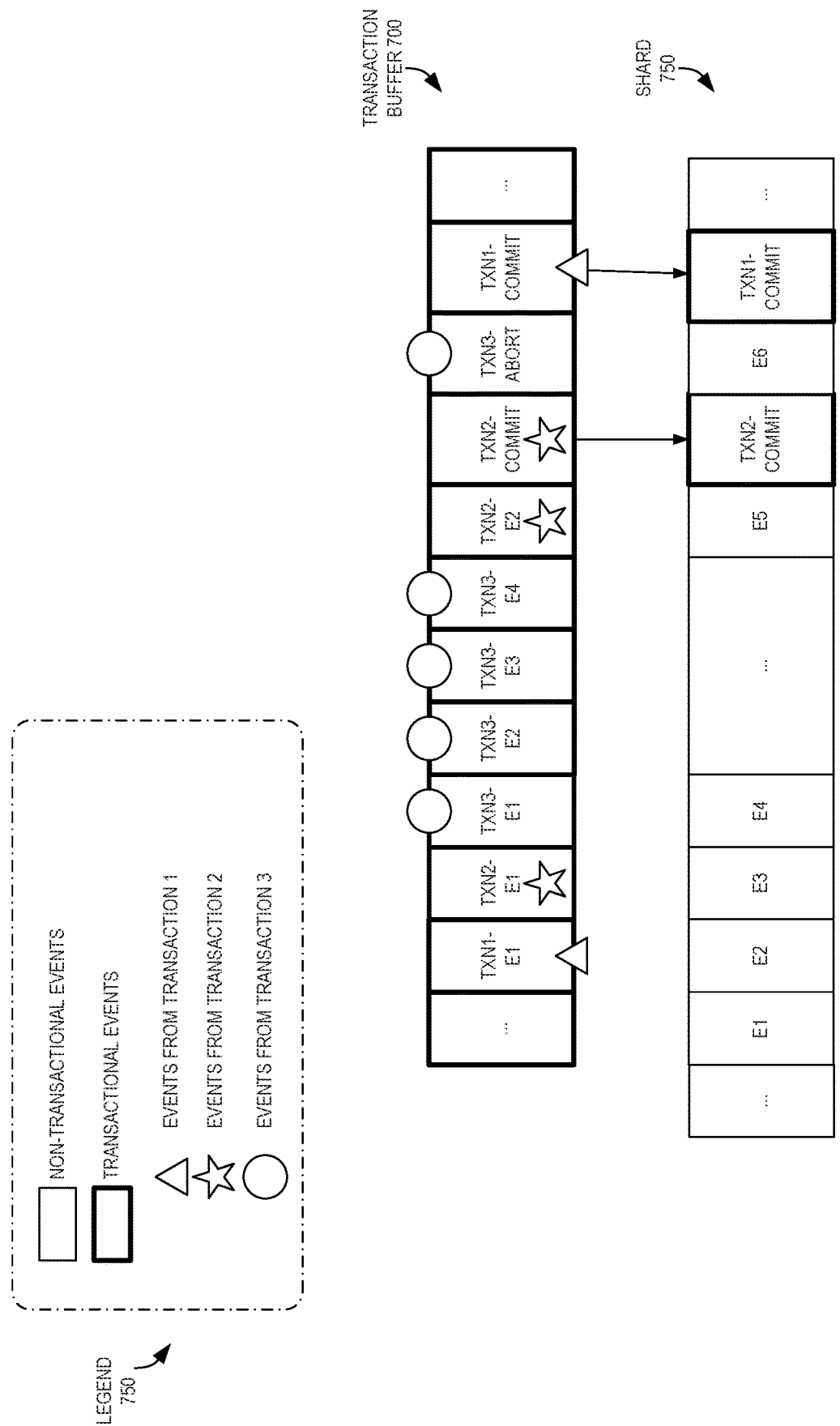
FIG. 7 is a diagram illustrating an example technique for using a separate shard as a transaction buffer in a distributed log-based append-only datastore according to some examples.

In contrast to the previous approach, another approach uses a separate transactional eventing service provided managed shard as the transaction buffer. For example, FIG. 7 is a diagram illustrating an example technique for using a separate transaction buffer 700 (e.g., implemented via a separate shard) in a distributed log-based append-only datastore according to some examples. A legend 750, similar to legend 650, identifies non-transactional events, transactional events, and different transactional events belonging to different transactions.

In this arrangement, the events involved in transactions are written to the transaction buffer 700. Because these events are not written to the shard, they are invisible to any consumers until they are committed. When committing a transaction, a COMMIT event is written to the shard, including the list of event IDs of its events, and then the same COMMIT event is written to the transaction buffer. (Further detail regarding the use of two COMMIT messages, in some examples, is provided later herein.) When aborting a transaction, an ABORT event may be written to the transaction log to mark the transaction as aborted.

In FIG. 7, at 750 the regular white boxes represent events produced by a non-transactional client, e.g., E1, E2, E3, etc. The boxes with thick borders represent messages produced by transactions, with different overlaid shapes indicating different transaction. Each event produced by a transaction is labelled as <txn>-<event> (e.g., "txn2-e2"). <txn>-commit or <txn>-abort are the markers appended when committing or aborting a given transaction.

In this approach, transactional events are appended directly to the partition's transaction buffer. Each transaction will be using transaction id as the producer id to produce to the partition's transaction buffer 700. When transaction coordinator begins committing a transaction, it writes a <txn>-commit marker to the shard 750 to indicate the transaction is marked as COMMITTED. This operation seals the transaction. The commit marker can be served as an index to the transaction events during the materialization.

When the transaction coordinator begins aborting a transaction, it writes a <txn>-abort marker to the transaction buffer 700 to indicate that the transaction is marked as ABORTED. This operation seals the transaction. The commit marker is written to the shard 750 can be essentially a pointer to a batch of events involved in a transaction. The separation of transactional data and normal data creates an isolation between transactions and normal use cases to ensure that the transactional use cases do not impact normal use cases.

As shown, out of three transactions—txn1, txn2, and txn3—here both txn1 and txn2 are committed, while txn3 is aborted.

Similar to the first approach (of using shards participating in transaction as the transaction buffer), the commit marker "<txn>-commit" can be used to mark a transaction as COMMITTED to allow materialization of the events for the consumers. "<txn>-abort" is the commit marker used for marking the transaction as ABORTED. Once a transaction is marked as ABORTED, the events of the transaction are safe to be removed. However, as in some examples the transaction buffer is append-only, there may not be a way to delete individual events from the shards. When a materialization happens on a commit marker, it will load the commit marker into the memory and find the event IDs of the transaction to materialize.

In some examples, a single shard may be used to store transaction buffers for multiple other shards, e.g., via inclusion and use of an additional shard identifier associated with each event in this buffer, among other possible techniques. Thus, this single-shard transaction buffer (or, transaction buffer stored in some other single data structure) may include events that reference exactly one shard, or reference more than one shard.

Application Programming Interfaces

Various APIs and associated data structures can be used to support transactional semantics via the transactional eventing service 102. These APIs/data structures can be generated in a variety of formats and are represented below via use of an Interface Definition Language (IDS), such as the Smithy IDL.

For example, a StartTransactionRequest message may be sent from clients to the transactional eventing service 102 (e.g., toward a transaction coordinator) when opening a new transaction.

```
string RequestId
integer TransactionTtlInSeconds //Default 0
string TransactionId // UUID
structure StartTransactionRequest {
    @required
    RequestId: RequestId,
    TransactionTtlInSeconds: TransactionTtlInSeconds
}
```

The following is an example StartTransactionResponse message, sent from a transaction coordinator to the calling client.

```
structure StartTransactionResponse {
    @required
    RequestId: RequestId,
    @required
    TransactionId: TransactionId
}
```

The following is an example EndTransactionRequest message sent from a client to a transaction coordinator when ending (committing or aborting) a transaction. The value for TransactionAction could be, for example, either COMMIT or ABORT.

```
Structure EndTransactionRequest {
    @required
    RequestId: RequestId,
    @required
    TransactionAction: TransactionAction // "COMMIT" OR "ABORT"
}
```

The following is an example set of transaction statuses (e.g., an enum string TransactionStatus) managed by the transaction coordinator, which keeps track of the status of the transaction as described herein—{"OPEN", "COMMITTING", "COMMITTED", "ABORTING", "ABORTED"}.

In some examples, the transaction coordinator records every change in a transaction log to make sure that the details are available in case of a crash. The client sends an identifier of each entity (e.g., aggregate) that is part of the transaction to the transaction coordinator. This way, the coordinator can track all the streams and shards that are part of the transaction. The transaction coordinator in some examples can thus record the entity, the streams that are part of the transaction, etc., in the transaction metadata. This transaction metadata can then be used to know about all of the shards that are part of the transaction. As the designated writer node handling the requests for a particular stream might change over the lifetime of the transaction, these entities are tracked in addition to the shard ID.

```
Structure TransactionMetadata {
  @required
  TransactionId: transactionId,
  @required
  ParticipatingStreamToEntityMap: ParticipatingStreamToEntityMap,
  @required
  ParticipatingShardToStreamMap: ParticipatingShardToStreamMap,
  @required
  TransactionStatus transactionStatus
}
```

For further understanding, an example e-commerce application built on a microservices architecture deploying a database per service pattern is presented to outline challenges associated with current state of the art implementation of transactions in a microservices architecture, which helps demonstrate how the saga-based transactional writes in a distributed log-based append-only datastore described herein can address those challenges.

As indicated earlier, the terms "saga" and "saga pattern" are commonly used to support business transactions that span multiple microservices. A "saga" is made up of an independent set of operations spanning across multiple services that all together form one atomic action. Each operation performs a local transaction and triggers the next operation in another service, such as via publishing an event or issuing a remote call. If a local transaction fails in a service because it violates a business rule, then the saga executes a series of compensating transactions that undo the changes that were made by the preceding operations.

Generally, there are two approaches for coordinating sagas. The decision making can be distributed so that processes are executed through decentralized choreography. Alternatively, decision making can be centralized to orchestrate the execution of business processes. For the following discussion with regard to FIG. 8 and FIG. 9, saga orchestration is used to demonstrate the challenges with implementing business transactions in a microservices architecture.

Figure 8:
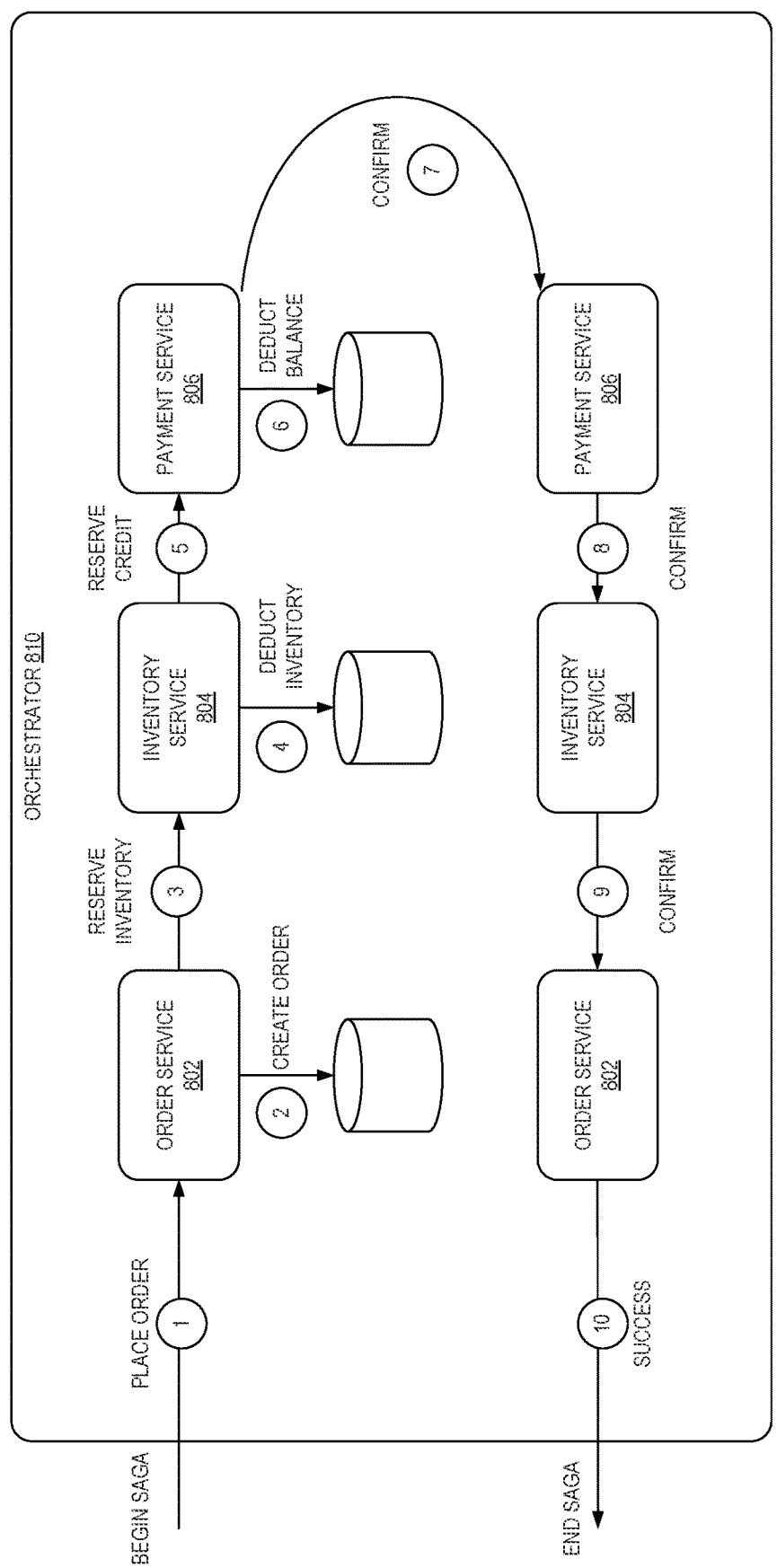
FIG. 8 is a diagram illustrating an example application successfully executing a saga-based transaction via use of a custom saga orchestration process.

FIG. 8 is a diagram illustrating an example application 800 successfully executing a saga-based transaction via use a custom orchestration process.

In an e-commerce store, the application must ensure that a new order will not exceed the available inventory of a product and a customer credit limit. The application is made up of an order service 802, inventory service 804, and payment service 806. Each microservice, which will be coordinated by an orchestrator 810, is expected to have at least two endpoints for each entity. One interface is for deducting and the other one is for resetting the transaction. For example, if we deduct inventory first and then later when we come to know about an insufficient balance from the payment system, the inventory can be added back via use of the second interface. The orchestrator 810 is responsible for coordinating all the transactions. When a new order is created, it may build a separate request for each service like payment-service/inventory-service etc. and validates the responses. If they are OK, it creates the order. If one of them is not, cancels the order. It also tries to reset any of local transactions which happened in any of the microservices.

In FIG. 8, an orchestrator 810, which is a separate service, coordinates the transactions among all the microservices and acts as a "saga coordinator." If all the microservices complete their part successfully, it makes the order-request complete, otherwise it marks that as cancelled. For simplicity, the communication between orchestrator and other services may be via a simple HTTP call, though other examples could use event-based communication between services and the orchestrator for sending commands and rolling back the local transactions to achieve the same result.

As shown at circle (1), the OrderService 802 receives a request for a new order, and at (2) the OrderService 802 saves a pending order and asks the saga coordinator (or, orchestrator 810) to start a create order transaction.

The saga coordinator sends a reserve inventory request at circle (3) to InventoryService 804, which performs a local transaction to deduct inventory at circle (4) and returns a "success" to the saga coordinator.

The saga coordinator sends a reserve credit request at circle (5) to PaymentService 806, which performs a local transaction to deduct payment from the customer account at circle (6) and returns a success to the coordinator (reflected as confirmation at circle (7)).

The saga coordinator (e.g., orchestrator 810) thus creates or rejects the order based on the credit and inventory reservation status, thus performing a confirmation at circles (8)-(10) to commit the order.

Figure 9:
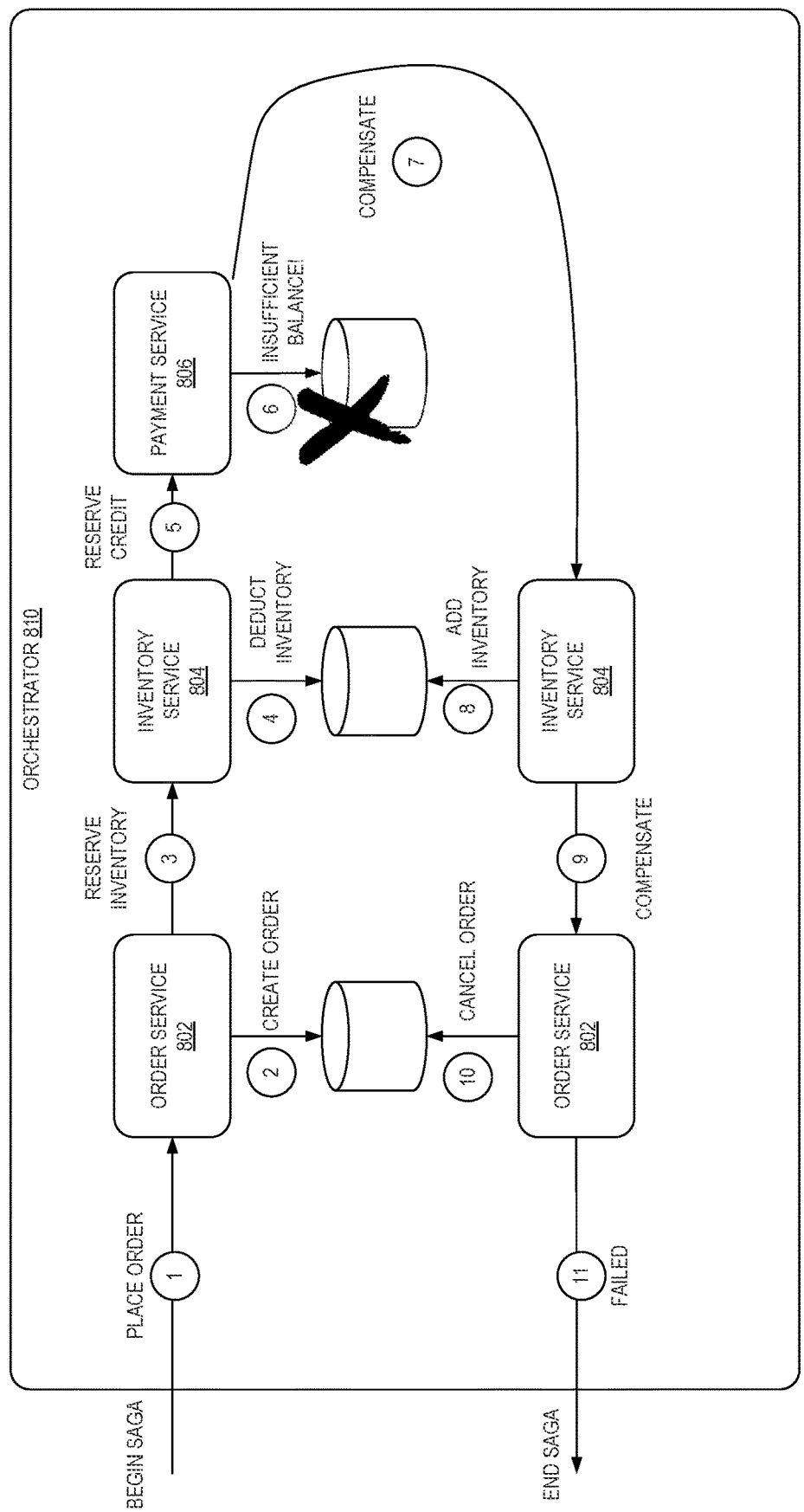
FIG. 9 is a diagram illustrating an example application unsuccessfully executing a saga-based transaction via use of a custom saga orchestration process.

Likewise, FIG. 9 is a diagram illustrating an example application unsuccessfully executing a saga-based transaction via use of a custom saga orchestration process. This figure demonstrates what a failed saga execution with orchestration looks like. With orchestration-based sagas, a saga participant may reply with a failure message (e.g., shown at circle (6) with a failure message of "insufficient balance", which tells the saga orchestrator to start executing compensating transaction shown at circle (7)-(11), where inventory is essentially added back at circle (8) and the order is cancelled at circle (10).

As indicated, there are significant challenges to utilizing saga orchestration. Notably, implementing saga coordination requires use of a complex distributed programming model, requires compensating operations from the participating services, has to deal with possible unrecoverable failures occurring during compensations, the lack of read isolation (e.g., a customer could see the order being created, but the next second, the order is removed due to a compensating action), and the lack of data isolation can impose durability challenges and anomalies like dirty reads, lost updates, and non-repeatable reads which require countermeasures implemented by the application creating overhead and complexity to application developers.

Instead, via use of a transactional eventing service 102 implementing saga-based transactional writes in a distributed log-based append-only datastore, this burden can be eliminated. Continuing the e-commerce store application, the business transaction for order creation as implemented via use of the transactional eventing service is described to illustrate how it addresses some of the challenges listed previously.

Figure 10:
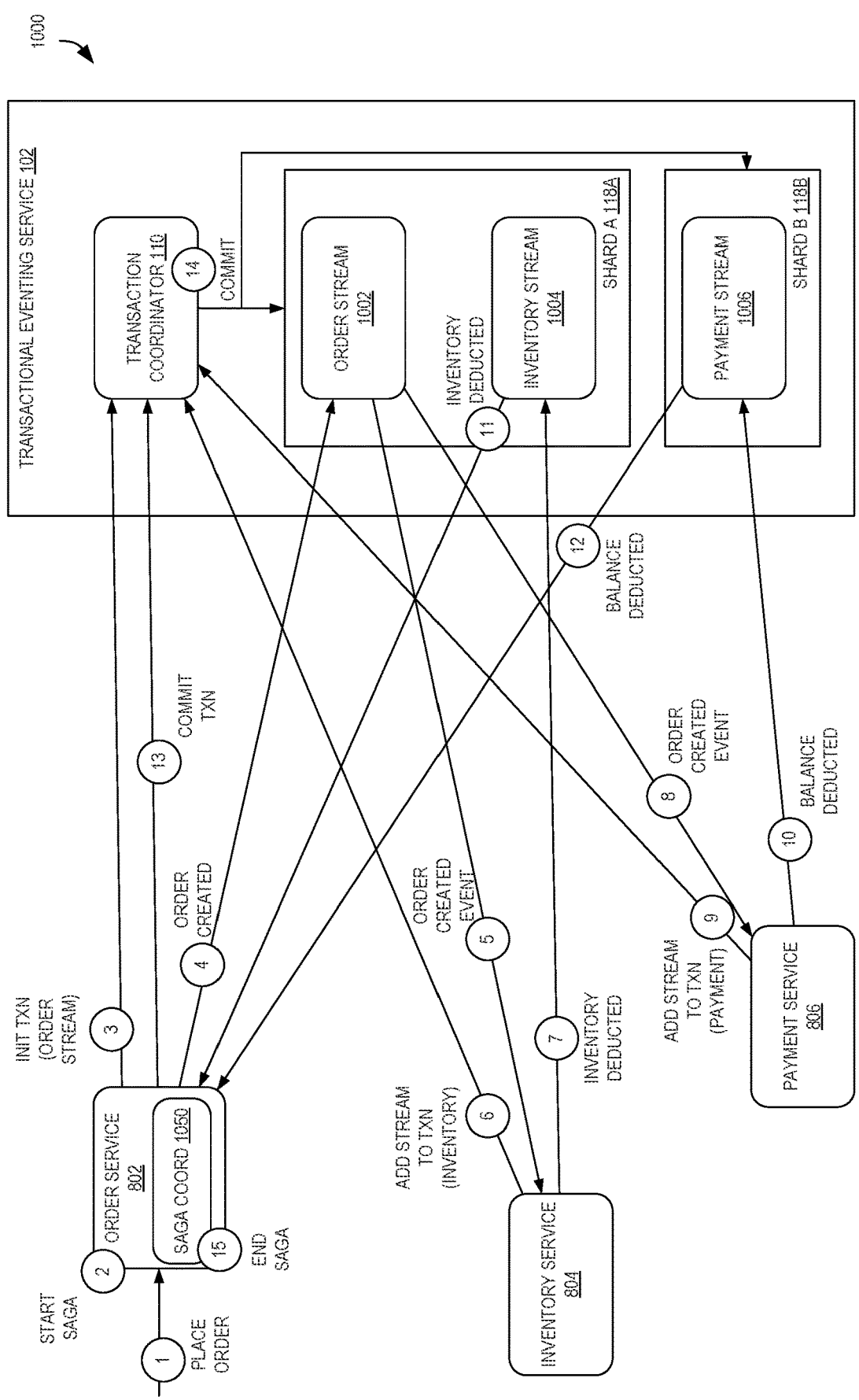
FIG. 10 is a diagram illustrating operations in a distributed log-based append-only datastore for an example application successfully executing a saga-based transaction according to some examples.

FIG. 10 is a diagram illustrating operations 1000 in a distributed log-based append-only datastore for an example application successfully executing a saga-based transaction according to some examples. In this example, at circle (1) the OrderService 802 receives a request for a new order, and at circle (2) the OrderService 802 initiates a create order saga (here it is also using a module to act as saga coordinator 1050, though in various examples the saga coordinator 1050 could be implemented as a separate component or via others of the services) and a transactional eventing service 102 transaction with the Order Stream 1002 hosted on Shard 'A' 118A as shown with circle (3).

The OrderService 802 thus publishes an OrderCreated event at circle (4) to the Order stream 1002 with the transaction ID returned by the transactional eventing service 102 transaction coordinator 110.

Next, the InventoryService 804 receives the OrderCreated event at circle (5) and adds the Inventory Stream 1004, hosted on Shard 'A' 118A, to the transaction, as shown at circle (6).

The InventoryService 804 publishes an InventoryDeducted event at circle (7) to the Inventory Stream 1004 with the transaction ID.

The PaymentService 806 also receives the OrderCreated event at circle (8) and adds the Payment Stream 1006, hosted on Shard 'B' 118B, to the transaction at circle (9).

Thereafter, the PaymentService 806 publishes a BalanceDeducted event at circle (10) to the Payment Stream 1006 hosted on Shard 'B' 118B with the transaction ID.

In this example, the saga coordinator 1050 in the OrderService 802, after receiving both the InventoryDeducted event at circle (11) and the BalanceDeducted event at circle (12), knows that all values can be committed, and thus commits the transaction via a command sent at circle (13). The transaction coordinator 110 then commits the transaction at circle (14), and upon completion the saga coordinator 1050 can end the saga at circle (15).

Figure 11:
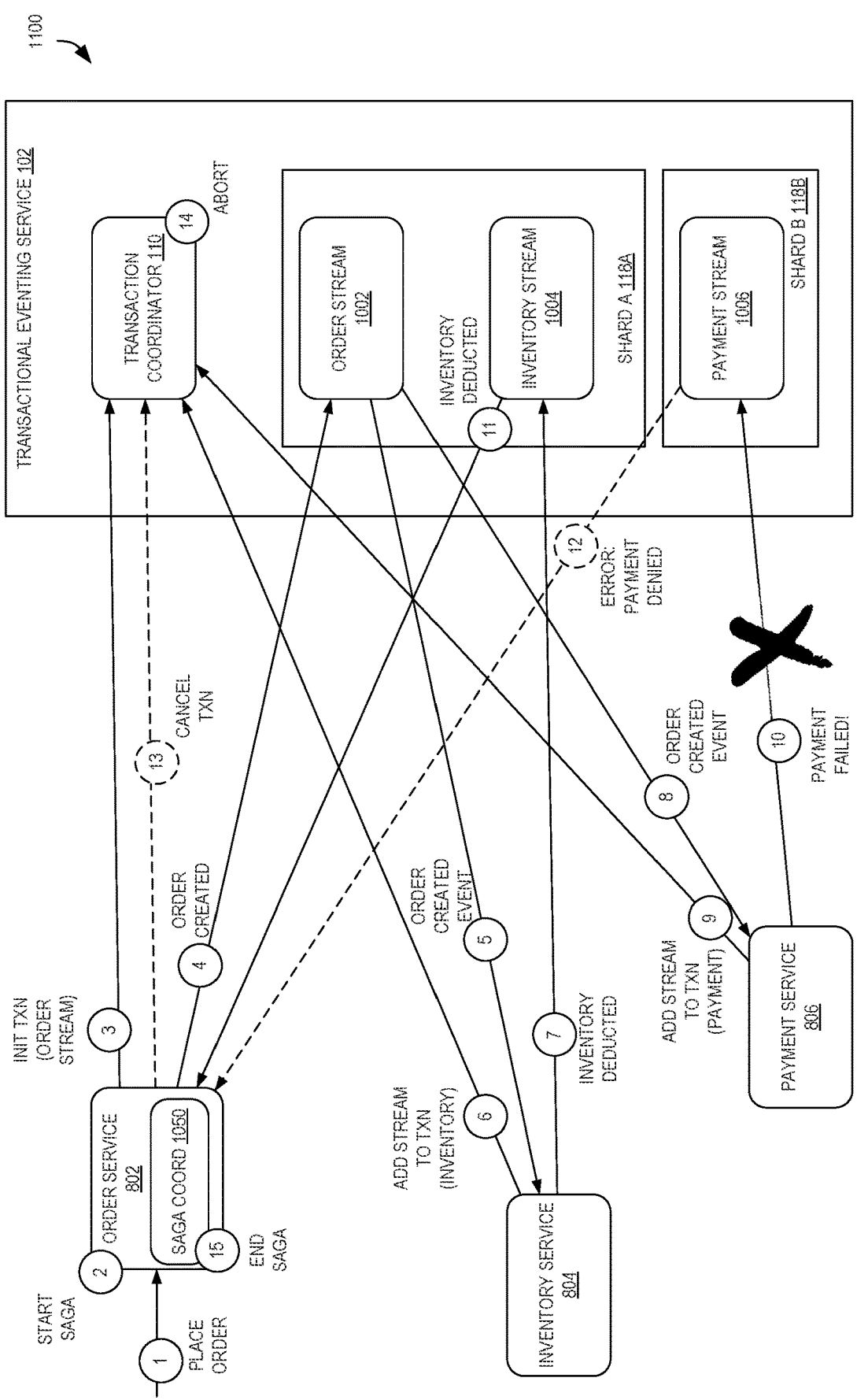
FIG. 11 is a diagram illustrating operations in a distributed log-based append-only datastore for an example application unsuccessfully executing a saga-based transaction according to some examples.

The use of transactional support via the transactional eventing service can also easily provide capabilities in the case of failure. For example, FIG. 11 is a diagram illustrating operations 1100 in a distributed log-based append-only datastore for an example application unsuccessfully executing a saga-based transaction according to some examples. In this example, a saga coordinator 1050 is implemented as part of order service 802, though in other examples the saga coordinator 1050 is implemented (additionally, or alternatively) in one or more of the services 802/804/806, and/or as a completely separate component or service.

The saga coordinator 1050 in the OrderService 802 could also abort the create order transaction if either it doesn't receive both the InventoryDeducted and BalanceDeducted events within the specified timeout for the transaction to complete, or if it receives one of the events notifying unsuccessful execution by the InventoryService 804 (InventorySold) or PaymentService 806 (PaymentDenied).

For example, in FIG. 1100, it may be the case that the PaymentService 806 is unable to successfully deduct the balance via the payment stream 1006, e.g., due to an admission condition on the stream prohibiting an event from being added if it causes the balance to fall below some threshold (e.g., zero, or even another non-zero value). Thus, at circle (10), the payment fails, and while the inventory is set to be deducted via circle (11), at circle (12) the denial of the payment causes the saga coordinator 1050 to cancel the transaction at circle (13), causing the transaction coordinator 110 to abort the transaction at circle (14) (such as through deleting the events within the non-illustrated transaction buffer), and thus the saga coordinator 1050 ends the saga at circle (15) without having committed all the events in these various streams in these various shards.

In some cases, however, a payment denied event may not be sent by the payment stream 1006 at circle (12)—such as due to a failure/crash—and thus it could be the case that the saga coordinator 1050 is configured to detect the non-receipt of such a message in a configured amount of time. In response, the saga coordinator 1050 could on its own cancel the transaction (e.g., via circles (13)-(15)). Additionally, or alternatively, the saga coordinator 1050 need not send an explicit "cancel" type message at circle (13), as it could be the case that a timeout value (described herein) could be tracked by the transaction coordinator 110, and upon it detecting that the timeout value amount of time has passed without the transaction being aborted, can simply abort the transaction on its own. Such a timeout value could be generally configured, or as described elsewhere herein, configured by the particular client (e.g., the saga coordinator 1050), such as via passing a value in the initialize transaction message sent at circle (3).

Moreover, it could be the case in some examples that there is a split of responsibility for opening and committing/abandoning a transaction, namely, that a first component (e.g., saga coordinator 1050 in order service 802) opens the transaction, but a completely different component (e.g., a non-illustrated saga coordinator 1050 component) may cancel or commit the transaction (e.g., as it may have visibility into a particular condition being satisfied). Thus, in some examples, the transactional eventing service 102 may allow more than one caller/client to interact with a transaction (e.g., any client may issue requests, or a defined set of clients can issue requests), though in other examples the issuance of commands (e.g., commit or cancel transaction requests) can be restricted to only the client that originally created the transaction. Such controls, in some examples, can be configured by the client (e.g., within the initialize transaction call, or generally for all interactions) by providing an identifier of which clients may validly issue transaction modifying calls.

Accordingly, the use of transactional support in the transactional eventing service can provide guarantees on atomicity and isolation to support use cases that need strong data consistency and can simplify sagas by eliminating the need to implement compensating actions.

Figure 12:
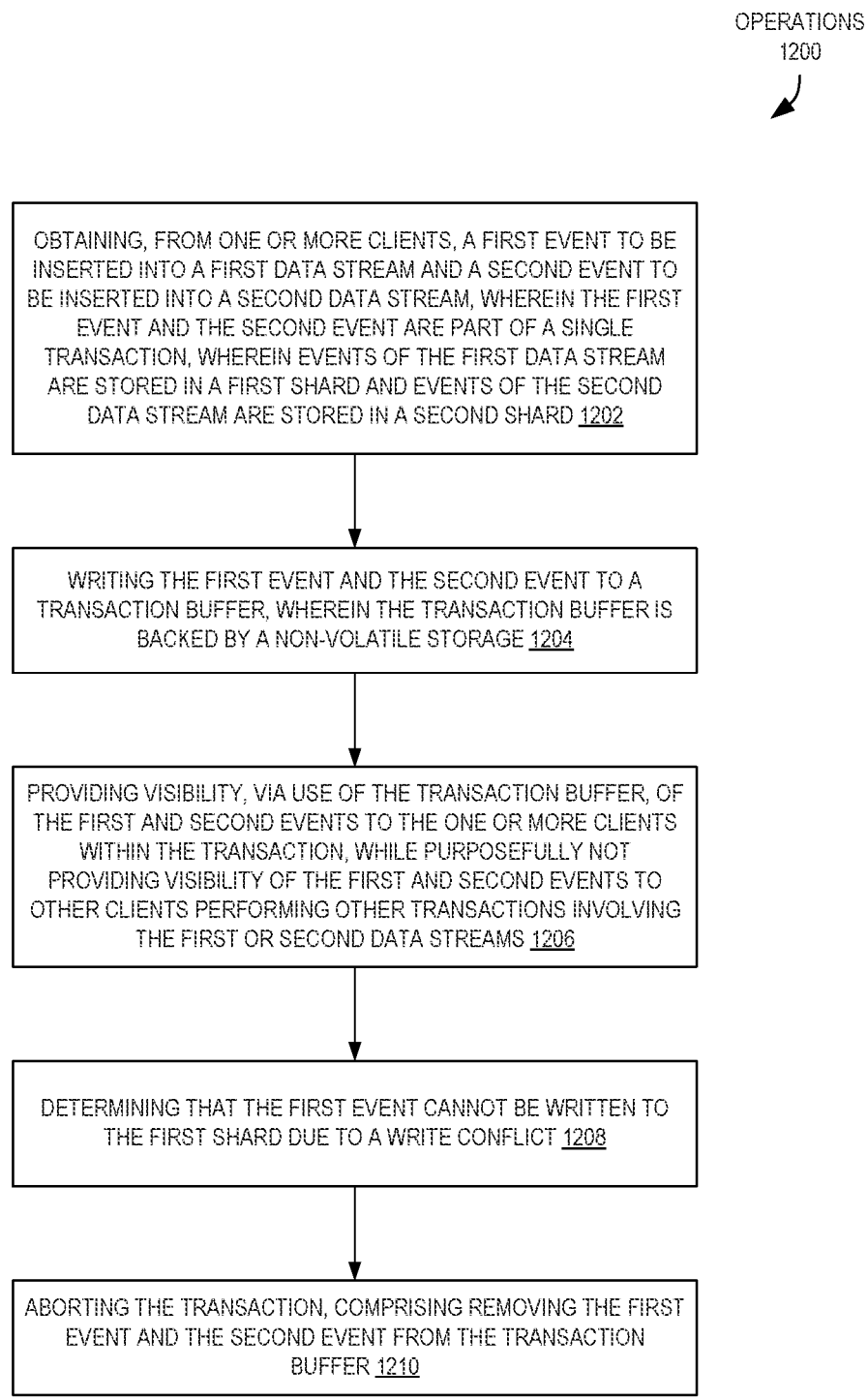
FIG. 12 is a flow diagram illustrating operations of a method for multi-stream transactional event processing in a distributed log-based append-only datastore according to some examples.

FIG. 12 is a flow diagram illustrating operations of a method for multi-stream transactional event processing in a distributed log-based append-only datastore according to some examples. Some or all of the operations 1200 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 1200 are performed by the transactional eventing service (e.g., some or all operations by the transaction coordinator) of the other figures.

The operations 1200 include, at block 1202, obtaining, from one or more clients, a first event to be inserted into a first data stream and a second event to be inserted into a second data stream, wherein the first event and the second event are part of a single transaction, wherein events of the first data stream are stored in a first shard and events of the second data stream are stored in a second shard.

The operations 1200 further include, at block 1204, writing the first event and the second event to a transaction buffer, wherein the transaction buffer is backed by a non-volatile storage.

The operations 1200 further include, at block 1206, providing visibility, via use of the transaction buffer, of the first and second events to the one or more clients within the transaction, while purposefully not providing visibility of the first and second events to other clients performing other transactions involving the first or second data streams.

The operations 1200 include, at block 1208, determining (e.g., based on use of an optimistic concurrency control (OCC) mechanism, and/or based on determining that an event condition is not satisfied) that the first event cannot be written to the first shard due to a write conflict.

In some examples, block 1208 includes attempting, by a first designated writer node associated with the first shard, to obtain locks associated with all events participating in the transaction in the first shard; and failing to obtain locks associated with all events participating in the transaction in the first shard.

The operations 1200 further include, at block 1210, aborting the transaction, comprising removing the first event and the second event from the transaction buffer.

In some examples, the operations 1200 further include generating a transaction identifier for the transaction; and updating an entry in a transaction log to include the transaction identifier, an identifier of the first stream, and identifier of the second stream, an identifier of the first shard, and an identifier of the second shard, wherein aborting the transaction further comprises updating a transaction status of the entry to indicate that the transaction is aborted.

In some examples, at least the obtaining, the writing, and the aborting are performed by a transaction coordinator. In some examples, the transaction coordinator is implemented as a separate service that is distinct from one or more nodes that write to the first shard and the second shard, and in some examples, the transaction coordinator is implemented as part of at least one node that is a designated writer for writes to either the first shard or the second shard.

In some examples, the transaction buffer is implemented as a third shard, wherein at least one entry in the transaction buffer comprises a pointer to a corresponding entry in the first shard or the second shard.

In some examples, the transaction buffer is implemented as part of the first shard, wherein entries in the first shard that are part of the transaction buffer include at least an additional field or value indicating membership of the entry in the transaction buffer.

In some examples, the operations 1200 further include analyzing, by a migration service, an application; and configuring one or more log-based append-only distributed data stores for the application to store events for the first stream and the second stream.

In some examples, the first event is obtained from a first microservice of an application as part of a saga transaction; and the second event is obtained from a second microservice of the application as part of the saga transaction.

In some examples, the operations 1200 further include receiving a start transaction request for a second transaction, the start transaction request including a timeout value; and based at least in part on determining that the timeout value amount of time has elapsed, aborting the second transaction.

Figure 13:
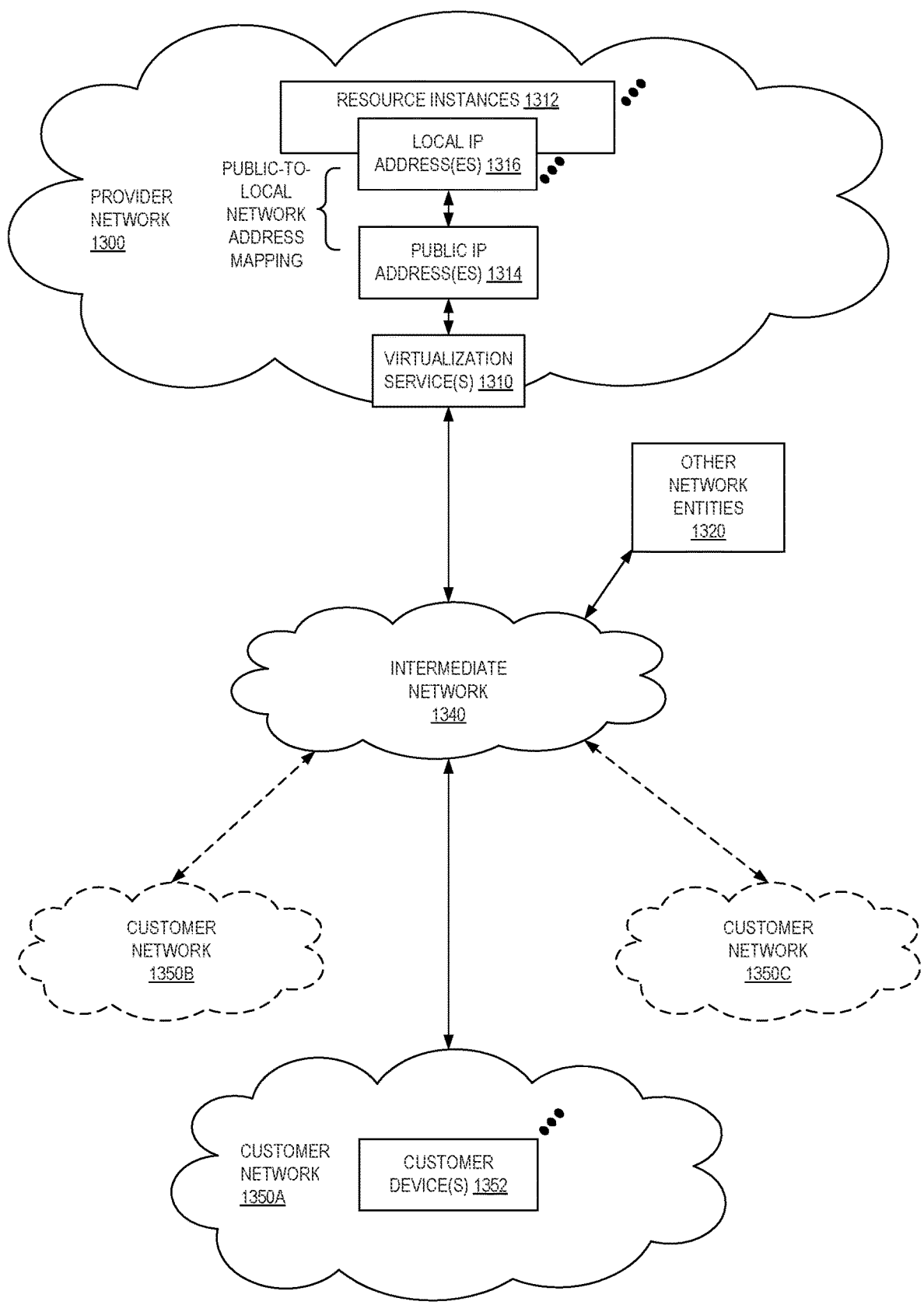
FIG. 13 illustrates an example provider network environment according to some examples.

FIG. 13 illustrates an example provider network (or "service provider system") environment according to some examples. A provider network 1300 can provide resource virtualization to customers via one or more virtualization services 1310 that allow customers to purchase, rent, or otherwise obtain instances 1312 of virtualized resources, including but not limited to computation and storage resources, implemented on devices within the provider network or networks in one or more data centers. Local Internet Protocol (IP) addresses 1316 can be associated with the resource instances 1312; the local IP addresses are the internal network addresses of the resource instances 1312 on the provider network 1300. In some examples, the provider network 1300 can also provide public IP addresses 1314 and/or public IP address ranges (e.g., Internet Protocol version 4 (IPv4) or Internet Protocol version 6 (IPv6) addresses) that customers can obtain from the provider 1300.

Conventionally, the provider network 1300, via the virtualization services 1310, can allow a customer of the service provider (e.g., a customer that operates one or more customer networks 1350A-1350C (or "client networks") including one or more customer device(s) 1352) to dynamically associate at least some public IP addresses 1314 assigned or allocated to the customer with particular resource instances 1312 assigned to the customer. The provider network 1300 can also allow the customer to remap a public IP address 1314, previously mapped to one virtualized computing resource instance 1312 allocated to the customer, to another virtualized computing resource instance 1312 that is also allocated to the customer. Using the virtualized computing resource instances 1312 and public IP addresses 1314 provided by the service provider, a customer of the service provider such as the operator of the customer network(s) 1350A-1350C can, for example, implement customer-specific applications and present the customer's applications on an intermediate network 1340, such as the Internet. Other network entities 1320 on the intermediate network 1340 can then generate traffic to a destination public IP address 1314 published by the customer network(s) 1350A-1350C; the traffic is routed to the service provider data center, and at the data center is routed, via a network substrate, to the local IP address 1316 of the virtualized computing resource instance 1312 currently mapped to the destination public IP address 1314. Similarly, response traffic from the virtualized computing resource instance 1312 can be routed via the network substrate back onto the intermediate network 1340 to the source entity 1320.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 1300; a customer can then assign their allocated public IP addresses to particular resource instances allocated to the customer. These public IP addresses can be referred to as customer public IP addresses, or simply customer IP addresses. Instead of being assigned by the provider network 1300 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 14:
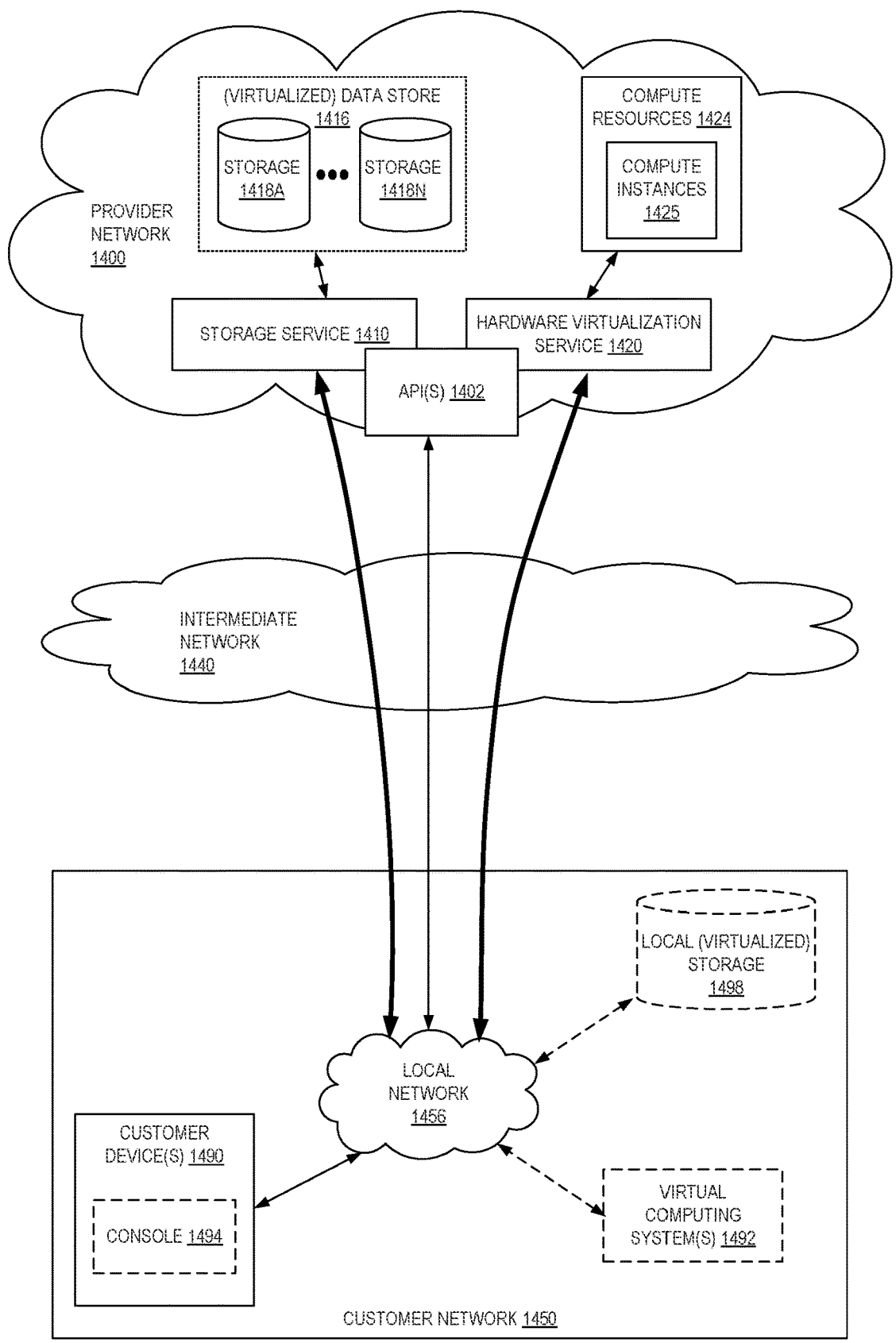
FIG. 14 is a block diagram of an example provider network that provides a storage service and a hardware virtualization service to customers according to some examples.

FIG. 14 is a block diagram of an example provider network environment that provides a storage service and a hardware virtualization service to customers, according to some examples. A hardware virtualization service 1420 provides multiple compute resources 1424 (e.g., compute instances 1425, such as VMs) to customers. The compute resources 1424 can, for example, be provided as a service to customers of a provider network 1400 (e.g., to a customer that implements a customer network 1450). Each computation resource 1424 can be provided with one or more local IP addresses. The provider network 1400 can be configured to route packets from the local IP addresses of the compute resources 1424 to public Internet destinations, and from public Internet sources to the local IP addresses of the compute resources 1424.

The provider network 1400 can provide the customer network 1450, for example coupled to an intermediate network 1440 via a local network 1456, the ability to implement virtual computing systems 1492 via the hardware virtualization service 1420 coupled to the intermediate network 1440 and to the provider network 1400. In some examples, the hardware virtualization service 1420 can provide one or more APIs 1402, for example a web services interface, via which the customer network 1450 can access functionality provided by the hardware virtualization service 1420, for example via a console 1494 (e.g., a web-based application, standalone application, mobile application, etc.) of a customer device 1490. In some examples, at the provider network 1400, each virtual computing system 1492 at the customer network 1450 can correspond to a computation resource 1424 that is leased, rented, or otherwise provided to the customer network 1450.

From an instance of the virtual computing system(s) 1492 and/or another customer device 1490 (e.g., via console 1494), the customer can access the functionality of a storage service 1410, for example via the one or more APIs 1402, to access data from and store data to storage resources 1418A-1418N of a virtual data store 1416 (e.g., a folder or "bucket," a virtualized volume, a database, etc.) provided by the provider network 1400. In some examples, a virtualized data store gateway (not shown) can be provided at the customer network 1450 that can locally cache at least some data, for example frequently accessed or critical data, and that can communicate with the storage service 1410 via one or more communications channels to upload new or modified data from a local cache so that the primary store of data (the virtualized data store 1416) is maintained. In some examples, a user, via the virtual computing system 1492 and/or another customer device 1490, can mount and access virtual data store 1416 volumes via the storage service 1410 acting as a storage virtualization service, and these volumes can appear to the user as local (virtualized) storage 1498.

While not shown in FIG. 14, the virtualization service(s) can also be accessed from resource instances within the provider network 1400 via the API(s) 1402. For example, a customer, appliance service provider, or other entity can access a virtualization service from within a respective virtual network on the provider network 1400 via the API(s) 1402 to request allocation of one or more resource instances within the virtual network or within another virtual network.

Illustrative Systems

Figure 15:
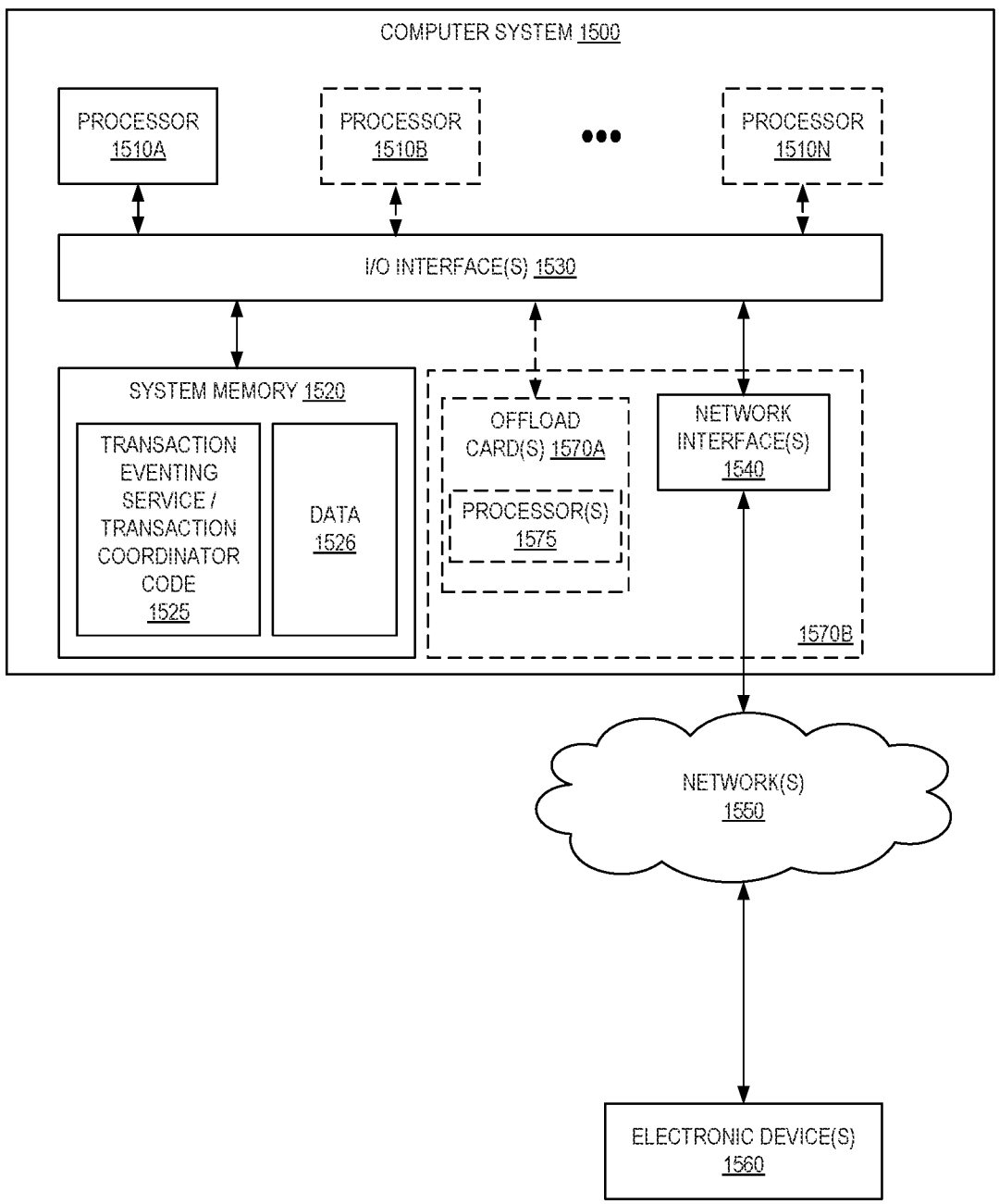
FIG. 15 is a block diagram illustrating an example computer system that can be used in some examples.

In some examples, a system that implements a portion or all of the techniques described herein can include a general-purpose computer system, such as the computer system 1500 illustrated in FIG. 15, that includes, or is configured to access, one or more computer-accessible media. In the illustrated example, the computer system 1500 includes one or more processors 1510 coupled to a system memory 1520 via an input/output (I/O) interface 1530. The computer system 1500 further includes a network interface 1540 coupled to the I/O interface 1530. While FIG. 15 shows the computer system 1500 as a single computing device, in various examples the computer system 1500 can include one computing device or any number of computing devices configured to work together as a single computer system 1500.

In various examples, the computer system 1500 can be a uniprocessor system including one processor 1510, or a multiprocessor system including several processors 1510 (e.g., two, four, eight, or another suitable number). The processor(s) 1510 can be any suitable processor(s) capable of executing instructions. For example, in various examples, the processor(s) 1510 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1510 can commonly, but not necessarily, implement the same ISA.

The system memory 1520 can store instructions and data accessible by the processor(s) 1510. In various examples, the system memory 1520 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1520 as transactional eventing service or transaction coordinator code 1525 (e.g., executable to implement, in whole or in part, the transactional eventing service 102 and/or transaction coordinator 110) and data 1526.

In some examples, the I/O interface 1530 can be configured to coordinate I/O traffic between the processor 1510, the system memory 1520, and any peripheral devices in the device, including the network interface 1540 and/or other peripheral interfaces (not shown). In some examples, the I/O interface 1530 can perform any necessary protocol, timing, or other data transformations to convert data signals from one component (e.g., the system memory 1520) into a format suitable for use by another component (e.g., the processor 1510). In some examples, the I/O interface 1530 can include support for devices attached through various types of peripheral buses, such as a variant of the Peripheral Component Interconnect (PCI) bus standard or the Universal Serial Bus (USB) standard, for example. In some examples, the function of the I/O interface 1530 can be split into two or more separate components, such as a north bridge and a south bridge, for example. Also, in some examples, some or all of the functionality of the I/O interface 1530, such as an interface to the system memory 1520, can be incorporated directly into the processor 1510.

The network interface 1540 can be configured to allow data to be exchanged between the computer system 1500 and other devices 1560 attached to a network or networks 1550, such as other computer systems or devices as illustrated in FIG. 1, for example. In various examples, the network interface 1540 can support communication via any suitable wired or wireless general data networks, such as types of Ethernet network, for example. Additionally, the network interface 1540 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 1500 includes one or more offload cards 1570A or 1570B (including one or more processors 1575, and possibly including the one or more network interfaces 1540) that are connected using the I/O interface 1530 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 1500 can act as a host electronic device (e.g., operating as part of a hardware virtualization service) that hosts compute resources such as compute instances, and the one or more offload cards 1570A or 1570B execute a virtualization manager that can manage compute instances that execute on the host electronic device. As an example, in some examples the offload card(s) 1570A or 1570B can perform compute instance management operations, such as pausing and/or un-pausing compute instances, launching and/or terminating compute instances, performing memory transfer/copying operations, etc. These management operations can, in some examples, be performed by the offload card(s) 1570A or 1570B in coordination with a hypervisor (e.g., upon a request from a hypervisor) that is executed by the other processors 1510A-1510N of the computer system 1500. However, in some examples the virtualization manager implemented by the offload card(s) 1570A or 1570B can accommodate requests from other entities (e.g., from compute instances themselves), and can not coordinate with (or service) any separate hypervisor.

In some examples, the system memory 1520 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 1500 via the I/O interface 1530. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 1500 as the system memory 1520 or another type of memory. Further, a computer-accessible medium can include transmission media or signals such as electrical, electromagnetic, or digital signals, conveyed via a communication medium such as a network and/or a wireless link, such as can be implemented via the network interface 1540.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1418A-1418N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) of these nouns unless such an ordering is otherwise explicitly indicated. Similarly, the values of such numeric labels are not used to indicate a required amount of a particular noun in the claims; for example, a "fifth" element generally does not imply the existence of four other elements unless those elements are explicitly included in the claims or it is otherwise abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
   receiving, at a transaction coordinator, a start transaction request message seeking to initiate an atomic and isolated transaction;
   generating, by the transaction coordinator, a transaction identifier for the transaction;
   updating by the transaction coordinator, a transaction log entry for the transaction, the transaction log entry to include at least a transaction status value, the transaction identifier, identifiers of a first data stream and a second data stream as being part of the transaction, and identifiers of a first shard and a second shard as being part of the transaction;
   obtaining, by the transaction coordinator from one or more clients, a first event to be inserted into the first data stream and a second event to be inserted into the second data stream as part of the transaction;
   writing, by the transaction coordinator, the first event and the second event to a transaction buffer, wherein the transaction buffer is backed by a non-volatile storage, wherein: the transaction buffer is implemented as a third shard, wherein at least one entry in the transaction buffer comprises a pointer to a corresponding entry in the first shard or the second shard; or the transaction buffer is implemented as part of the first shard, wherein entries in the first shard that are part of the transaction buffer include at least an additional field or value indicating membership of the entry in the transaction buffer;
   providing visibility, via use of the transaction buffer, of the first and second events to the one or more clients within the transaction, while purposefully not providing visibility of the first and second events to other clients performing other transactions involving the first or second data streams;
   determining, based on use of an optimistic concurrency control (OCC) mechanism, that the first event cannot be written to the first shard; and
   aborting the transaction by the transaction coordinator, comprising removing the first event and the second event from the transaction buffer and updating the transaction status value of the transaction log entry for the transaction to indicate that the transaction was aborted.

2. The computer-implemented method of claim 1, wherein:
   the transaction coordinator is implemented as a separate service that is distinct from one or more nodes that write to the first shard and the second shard; or
   the transaction coordinator is implemented as part of at least one node that is a designated writer for writes to either the first shard or the second shard.

3. A computer-implemented method comprising:
   obtaining, from one or more clients, a first event to be inserted into a first data stream and a second event to be inserted into a second data stream, wherein the first event and the second event are part of a single transaction, wherein events of the first data stream are stored in a first shard and events of the second data stream are stored in a second shard;
   writing the first event and the second event to a transaction buffer, wherein the transaction buffer is backed by a non-volatile storage, wherein:
   the transaction buffer is implemented as a third shard, wherein at least one entry in the transaction buffer comprises a pointer to a corresponding entry in the first shard or the second shard; or the transaction buffer is implemented as part of the first shard, wherein entries in the first shard that are part of the transaction buffer include at least an additional field or value indicating membership of the entry in the transaction buffer;
   providing visibility, via use of the transaction buffer, of the first and second events to the one or more clients within the transaction, while purposefully not providing visibility of the first and second events to other clients performing other transactions involving the first or second data streams;
   determining that the first event cannot be written to the first shard due to a write conflict; and
   aborting the transaction, comprising removing the first event and the second event from the transaction buffer.

4. The computer-implemented method of claim 3, further comprising:
   generating a transaction identifier for the transaction; and
   updating an entry in a transaction log to include the transaction identifier, an identifier of the first data stream, and identifier of the second data stream, an identifier of the first shard, and an identifier of the second shard,
   wherein aborting the transaction further comprises updating a transaction status of the entry to indicate that the transaction is aborted.

5. The computer-implemented method of claim 3, wherein the determining that the first event cannot be written to the first shard includes:
   attempting, by a first designated writer node associated with the first shard, to obtain locks associated with all events participating in the transaction in the first shard; and
   failing to obtain locks associated with all events participating in the transaction in the first shard.

6. The computer-implemented method of claim 3, wherein at least the obtaining, the writing, and the aborting are performed by a transaction coordinator.

7. The computer-implemented method of claim 6, wherein the transaction coordinator is implemented as a separate service that is distinct from one or more nodes that write to the first shard and the second shard.

8. The computer-implemented method of claim 6, wherein the transaction coordinator is implemented as part of at least one node that is a designated writer for writes to either the first shard or the second shard.

9. The computer-implemented method of claim 3, wherein the transaction buffer is implemented as the third shard.

10. The computer-implemented method of claim 3, wherein the transaction buffer is implemented as part of the first shard.

11. The computer-implemented method of claim 3, further comprising:
    analyzing, by a migration service, an application; and
    configuring one or more log-based append-only distributed data stores for the application to store events for the first data stream and the second data stream.

12. The computer-implemented method of claim 3, wherein:
    the first event is obtained from a first service of an application as part of a saga transaction; and
    the second event is obtained from a second service of the application as part of the saga transaction.

13. The computer-implemented method of claim 3, further comprising:
    receiving a start transaction request for a second transaction, the start transaction request including a timeout value; and
    based at least in part on determining that the timeout value amount of time has elapsed, aborting the second transaction.

14. A system comprising:
    a first one or more electronic devices comprising a processor and a memory, the first one or more electronic devices to implement shards to store events of streams as part of a log-based append-only distributed data store in a transactional eventing service in a multi-tenant provider network; and
    a second one or more electronic devices to implement a transaction coordinator of the transactional eventing service in the multi-tenant provider network, the transaction coordinator including instructions that upon execution cause the transaction coordinator to:
    obtain, from one or more clients, a first event to be inserted into a first data stream and a second event to be inserted into a second data stream, wherein the first event and the second event are part of a single transaction, wherein events of the first data stream are stored in a first shard and events of the second data stream are stored in a second shard;
    write the first event and the second event to a transaction buffer, wherein the transaction buffer is backed by a non-volatile storage, wherein: the transaction buffer is implemented as a third shard, wherein at least one entry in the transaction buffer comprises a pointer to a corresponding entry in the first shard or the second shard; or the transaction buffer is implemented as part of the first shard, wherein entries in the first shard that are part of the transaction buffer include at least an additional field or value indicating membership of the entry in the transaction buffer;
    provide visibility, via use of the transaction buffer, of the first and second events to the one or more clients within the transaction, while purposefully not providing visibility of the first and second events to other clients performing other transactions involving the first or second data streams;
    determine that the first event cannot be written to the first shard due to a write conflict; and
    abort the transaction, comprising a removal of the first event and the second event from the transaction buffer.

15. The system of claim 14, wherein the transaction coordinator further includes instructions that upon execution cause the transaction coordinator to:
    generate a transaction identifier for the transaction; and
    update an entry in a transaction log to include the transaction identifier, an identifier of the first data stream, and identifier of the second data stream, an identifier of the first shard, and an identifier of the second shard,
    wherein the abort of the transaction further comprises an update of a transaction status of the entry to indicate that the transaction is aborted.

16. The system of claim 14, wherein the transaction coordinator is implemented as a separate service that is distinct from on or more nodes that write to the first shard and the second shard.

17. The system of claim 14, wherein the transaction coordinator is implemented as part of at least one node that is a designated writer for writes to either the first shard or the second shard.

18. The system of claim 14, wherein the transaction buffer is implemented as a third shard, wherein at least one entry in the transaction buffer comprises a pointer to a corresponding entry in the first shard or the second shard.

19. The system of claim 14, wherein the transaction buffer is implemented as part of the first shard, wherein entries in the first shard that are part of the transaction buffer include at least an additional field or value indicating membership of the entry in the transaction buffer.

* * * * *